June 28, 1960 W. A. ANDERSON 2,942,776

ACTUATING MECHANISM FOR TEN KEY ADDING MACHINES

Filed Dec. 29, 1955 11 Sheets-Sheet 1

INVENTOR
WALTER A. ANDERSON
BY Jesse A. Holton
ATTORNEY

June 28, 1960 W. A. ANDERSON 2,942,776

ACTUATING MECHANISM FOR TEN KEY ADDING MACHINES

Filed Dec. 29, 1955 11 Sheets-Sheet 2

INVENTOR.
WALTER A. ANDERSON
BY Jesse A. Holton
ATTORNEY

June 28, 1960 W. A. ANDERSON 2,942,776

ACTUATING MECHANISM FOR TEN KEY ADDING MACHINES

Filed Dec. 29, 1955 11 Sheets-Sheet 3

INVENTOR.
WALTER A. ANDERSON

BY Jesse Q. Holton

ATTORNEY

June 28, 1960 W. A. ANDERSON 2,942,776

ACTUATING MECHANISM FOR TEN KEY ADDING MACHINES

Filed Dec. 29, 1955 11 Sheets-Sheet 4

INVENTOR.
WALTER A. ANDERSON
BY
Jesse A. Holton
ATTORNEY

ACTUATING MECHANISM FOR TEN KEY ADDING MACHINES

Filed Dec. 29, 1955 11 Sheets-Sheet 5

INVENTOR.
WALTER A. ANDERSON

BY Jesse A. Holton

ATTORNEY

INVENTOR.
WALTER A. ANDERSON

BY Jesse Q. Holton

ATTORNEY

INVENTOR.
WALTER A. ANDERSON
BY
Jesse A. Holton
ATTORNEY

ACTUATING MECHANISM FOR TEN KEY ADDING MACHINES

INVENTOR.
WALTER A. ANDERSON

BY Jesse A. Holton

ATTORNEY

June 28, 1960 W. A. ANDERSON 2,942,776

ACTUATING MECHANISM FOR TEN KEY ADDING MACHINES

Filed Dec. 29, 1955 11 Sheets-Sheet 9

INVENTOR.
WALTER A. ANDERSON

BY Jesse A. Holton

ATTORNEY

ACTUATING MECHANISM FOR TEN KEY ADDING MACHINES

Filed Dec. 29, 1955

INVENTOR.
WALTER A. ANDERSON
BY Jesse A. Holton
ATTORNEY

June 28, 1960 W. A. ANDERSON 2,942,776

ACTUATING MECHANISM FOR TEN KEY ADDING MACHINES

Filed Dec. 29, 1955 11 Sheets-Sheet 11

INVENTOR.
WALTER A. ANDERSON
BY Jesse A. Holton
ATTORNEY

United States Patent Office 2,942,776 Patented June 28, 1960

2,942,776

ACTUATING MECHANISM FOR TEN KEY ADDING MACHINES

Walter A. Anderson, Trumbull, Conn., assignor to Underwood Corporation, New York, N.Y., a corporation of Delaware Filed Dec. 29, 1955, Ser. No. 556,217

10 Claims. (Cl. 235—60)

This application relates to adding machines and more particularly to improvements in the indexing, driving, and printing mechanisms thereof to increase the speed of operation and to simplify the construction of such machines.

Ten key adding machines are well known and have been commercially produced for many years. In general such machines are satisfactory but operate slower than is desirable in modern office machines and cannot be appreciably speeded up without being subject to occasional errors and excessive wear. The present embodiment of an adding machine is designed to eliminate the sources of such occasional errors due to speed and to reduce or eliminate so far as is possible the factors requiring high factors of safety in timing tolerances with the result that the present machine can be safely cycled at speeds up to twice those of present machines.

It is an object of this invention to design an adding machine having as many as possible of the main operating parts operable by power rather than by springs so that no cycling time need be allowed as tolerance.

It is also an object of the invention to provide an adding machine in which the operated parts are driven by a rotary drive mechanism and without shock, thus avoiding wear due to high speed impacts between the parts.

A further object is to provide a key indexing mechanism which is suitable for operation by the fastest operator.

Another object is to develop a key indexing mechanism in which any key may be depressed before another is released and in which each key completes its function while it is being depressed.

A similar object is the provision of a touch tuning device for such a keyboard by which the force required to depress a key may be varied at will to suit the preferences of different operators.

A further object is to provide a differential mechanism controlled by the key indexing mechanism and operated by power both to and from a home position, thus eliminating rebound tendencies found in spring driven devices.

Still another object is to disclose a differential mechanism for an adding machine in which the arrest of the differential mechanism resets the set pins in a pin carriage so that it is unnecessary to return the pin carriage past its home position to reset the pins, thereby saving time and enabling faster operation.

An object auxiliary to the above is to provide a simple item repeat mechanism to prevent such pin resetting by the differential mechanism without change in the arresting function of the pins.

It is also an object of this invention to develop a simple rotary control mecahnism to shift the register into mesh with the differential mechanism in item entering, subtotal, and total operations.

Another object is the provision of a simplified total taking mechanism which does not require an idle stroke to restore any set transfer devices.

A part of the object above is the development of a transfer mechanism of the extra step of the differential mechanism type which may be reset before the differential mechanism is restored to a 0 position so that the reset part may be utilized in total taking.

A different object is in the provision of a simplified printing mechanism using a solid printing type member piovted on the differential mechanism bars.

A further object is in the design of power driven control members which are released by operation of a control key to set the function control parts by power and to initiate a machine cycle, thus lightening the pressure required to operate a control key and making the touch of all control keys uniform.

Still another object is the provision of a subtraction control for the adding machine register which control acts to sense either the position of the subtraction control key or the overdraft condition of the register at each machine cycle and is controlled to sense the one or the other by the indexed or non-indexed condition of the indexing mechanism.

A separate object is the development of a unitary inked ribbon feeding and ribbon vibrating mechanism which is cam driven and automatically adjustable into either a red or black ribbon position.

A further object is the provision of an item correction mechanism to correct an erroneous entry by restoring any set pins during a machine cycle in which the differential mechanism is prevented from moving to a printing position and the printing and platen line space drives are held ineffective.

Other objects conducive to the reduction of machine parts and to the increase of operating speed which are not particularly pointed out above will be in part obvious and in part specifically pointed out in the following description and accompanying drawings of a preferred embodiment of my invention.

Figures 3, 3A:
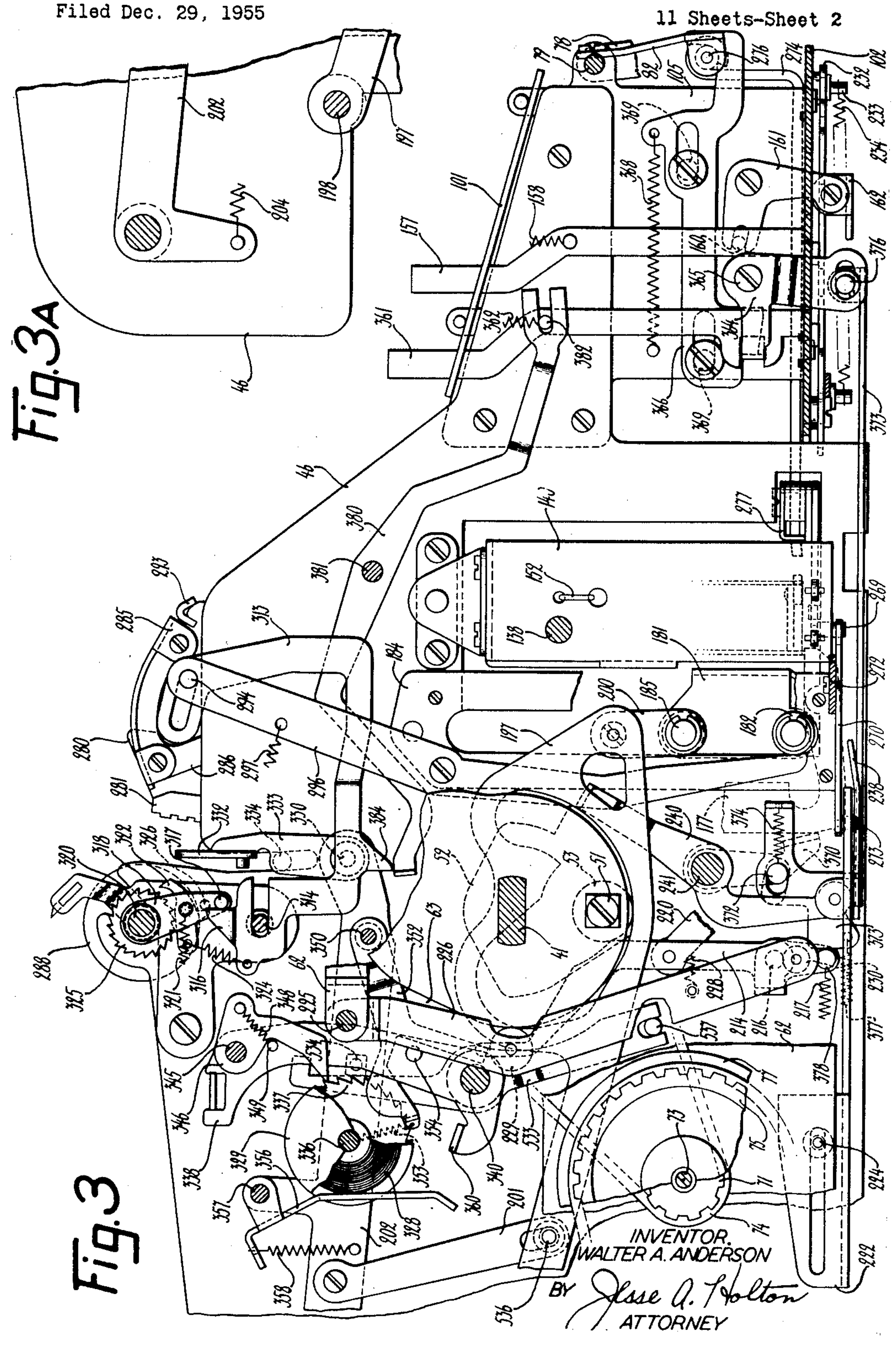
Figure 3 is a left side elevation with the motor clutch omitted for clarity.
Figure 3A is a continuation of Figure 3 showing the back part of the left side.
Figure 4:
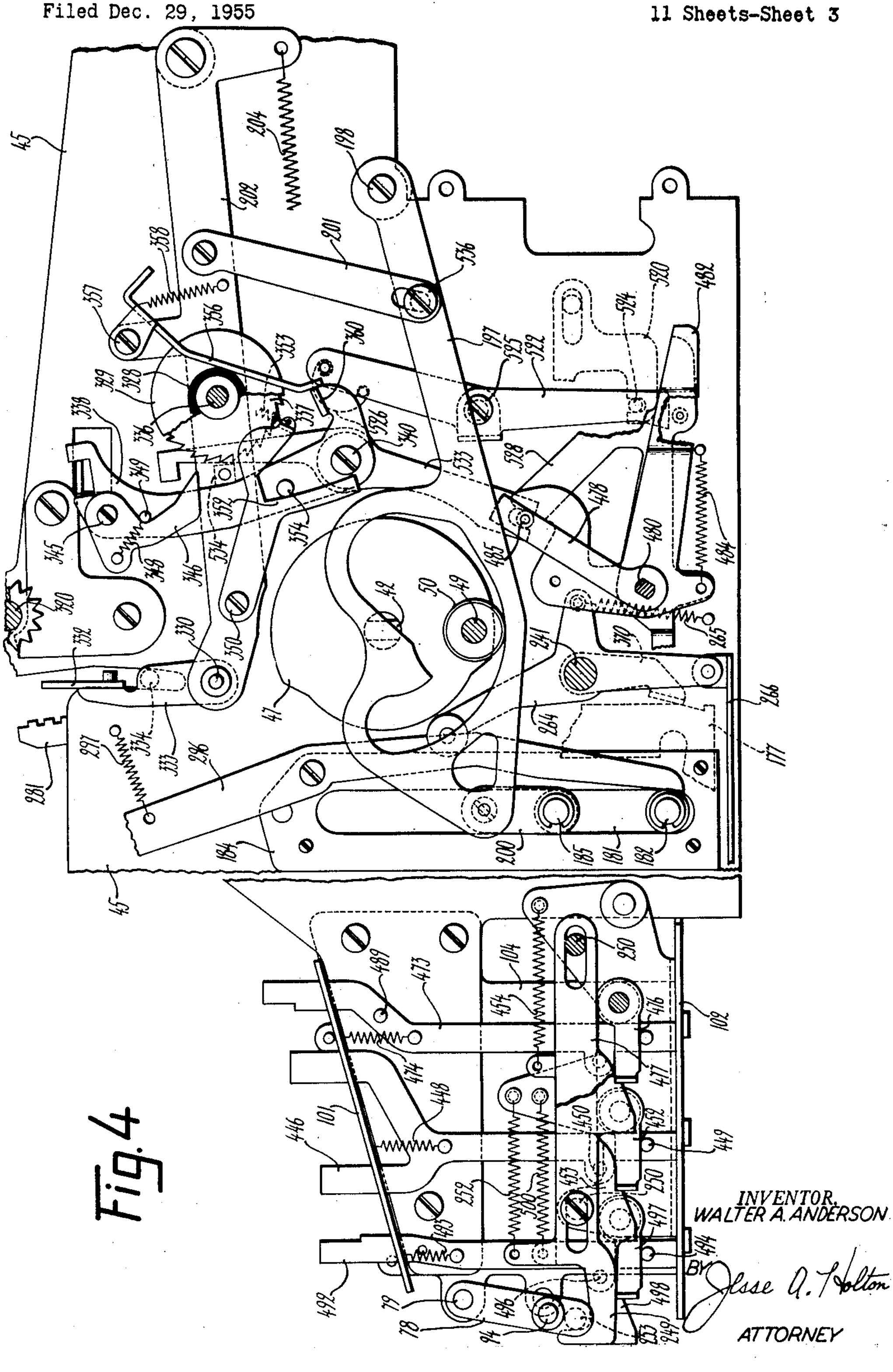
Figures 5, 5A, 6:
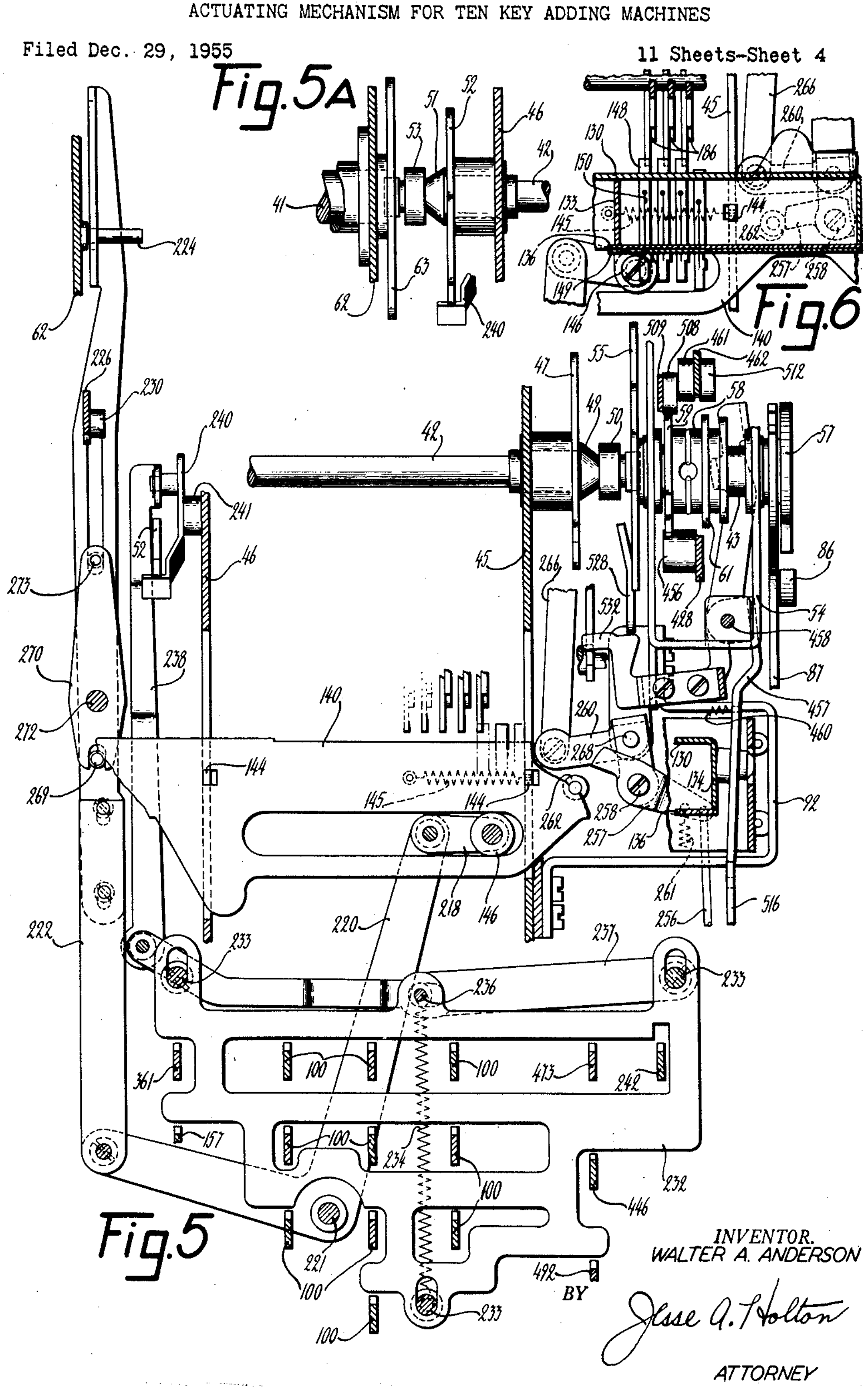
Figures 7, 7A, 7B, 8, 9, 10:
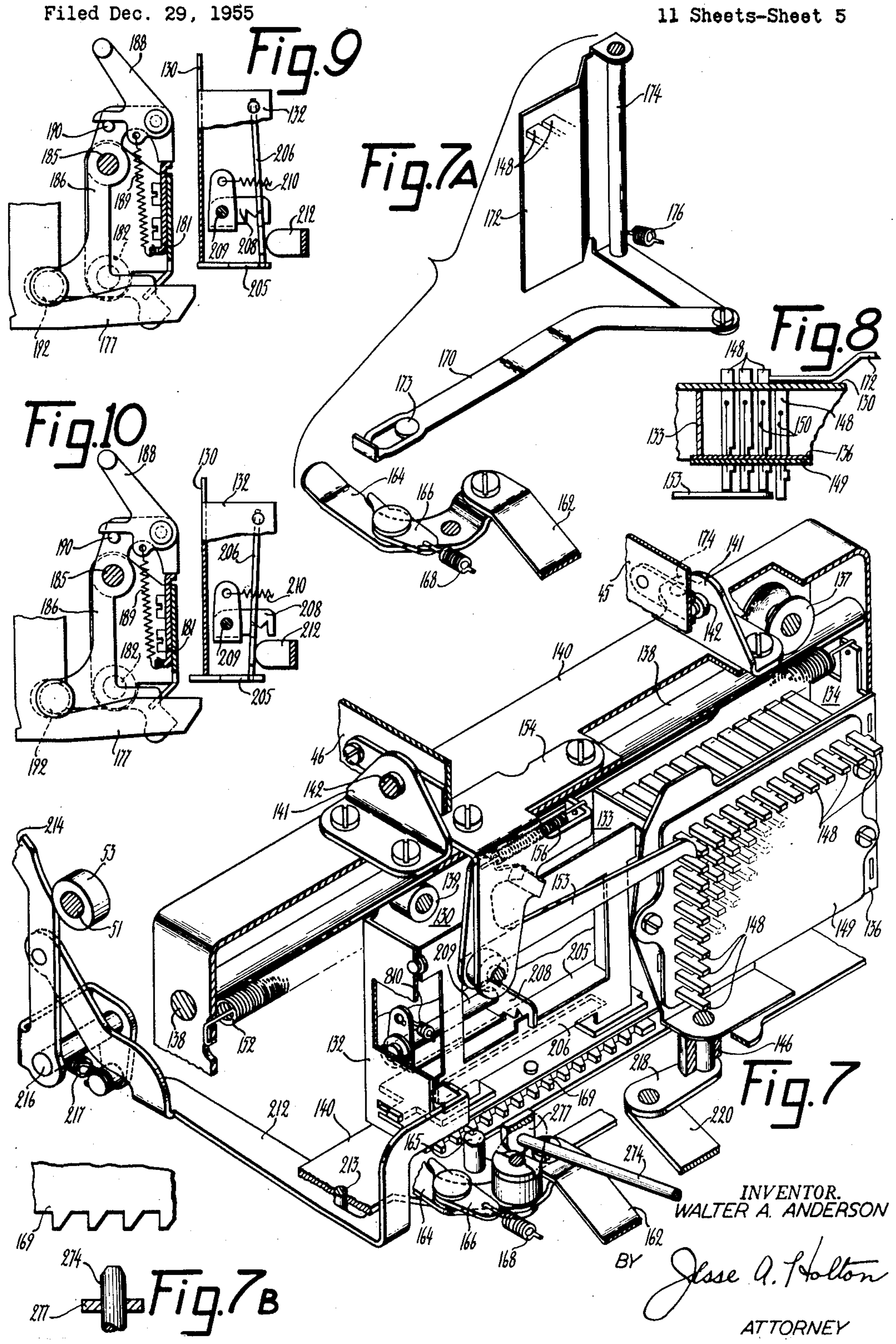
Figure 11:
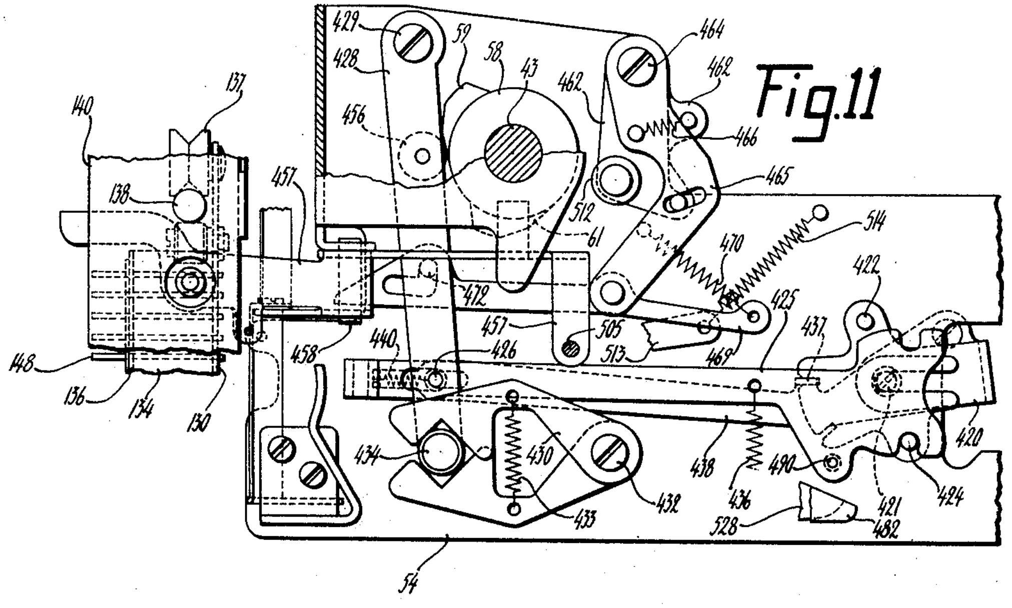
Figures 12, 13:
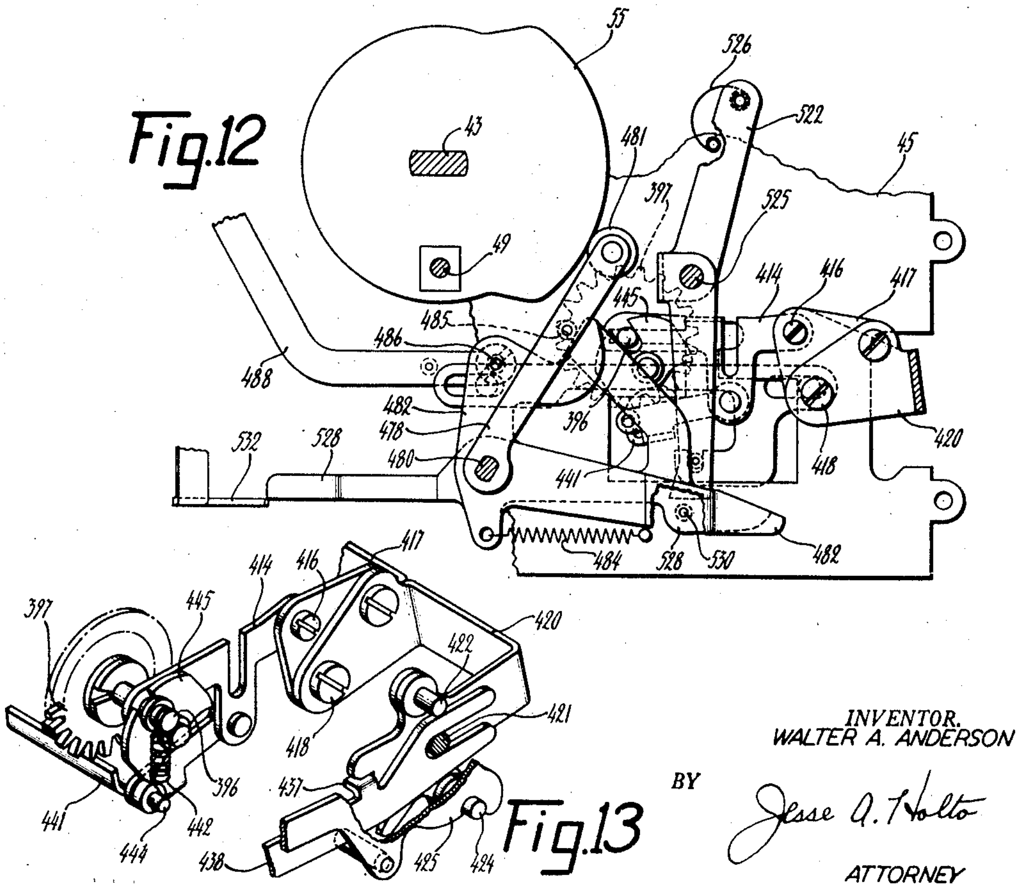
Figures 14, 15, 16, 17, 18, 19, 20, 21:
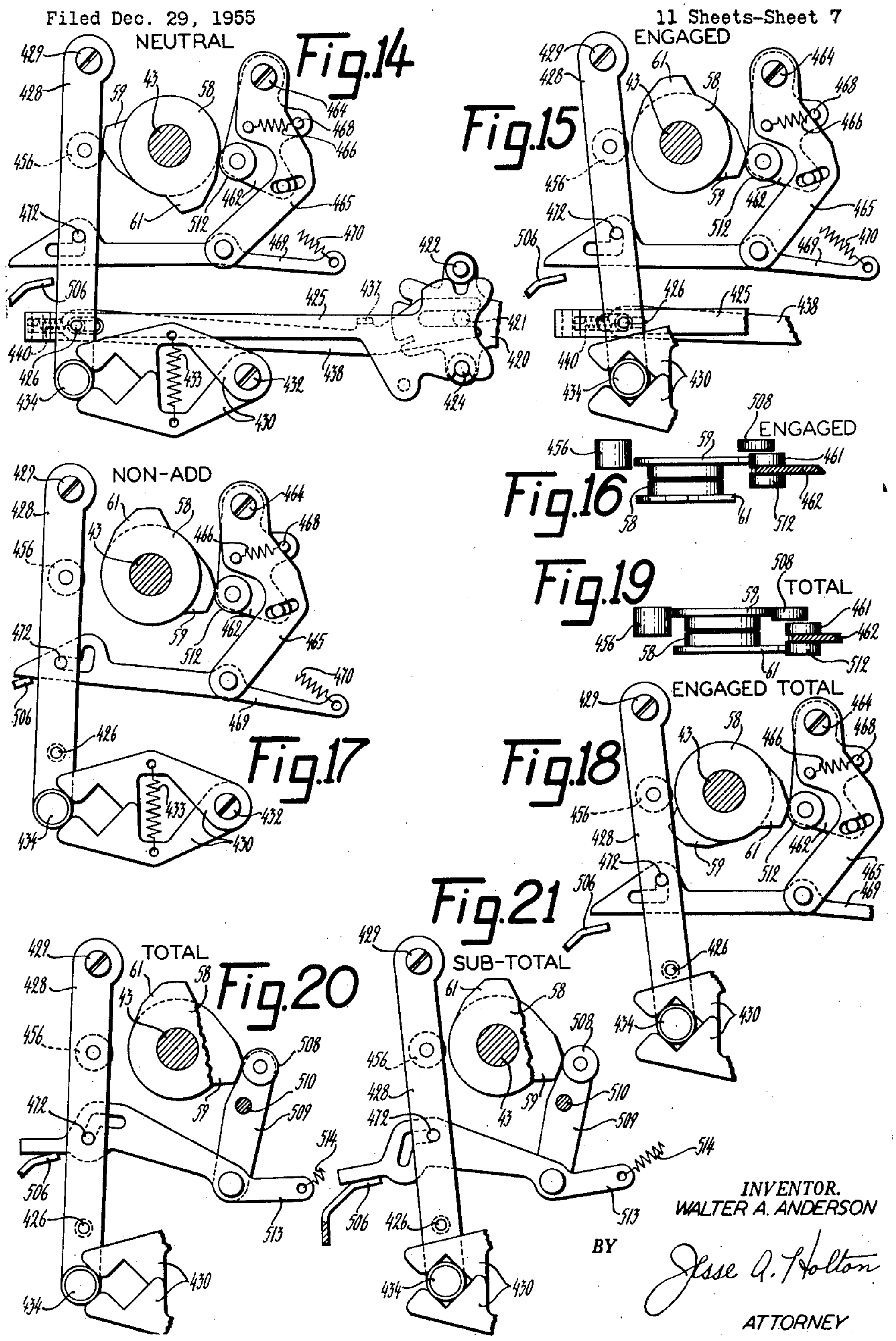
Figures 22, 23, 24, 25:
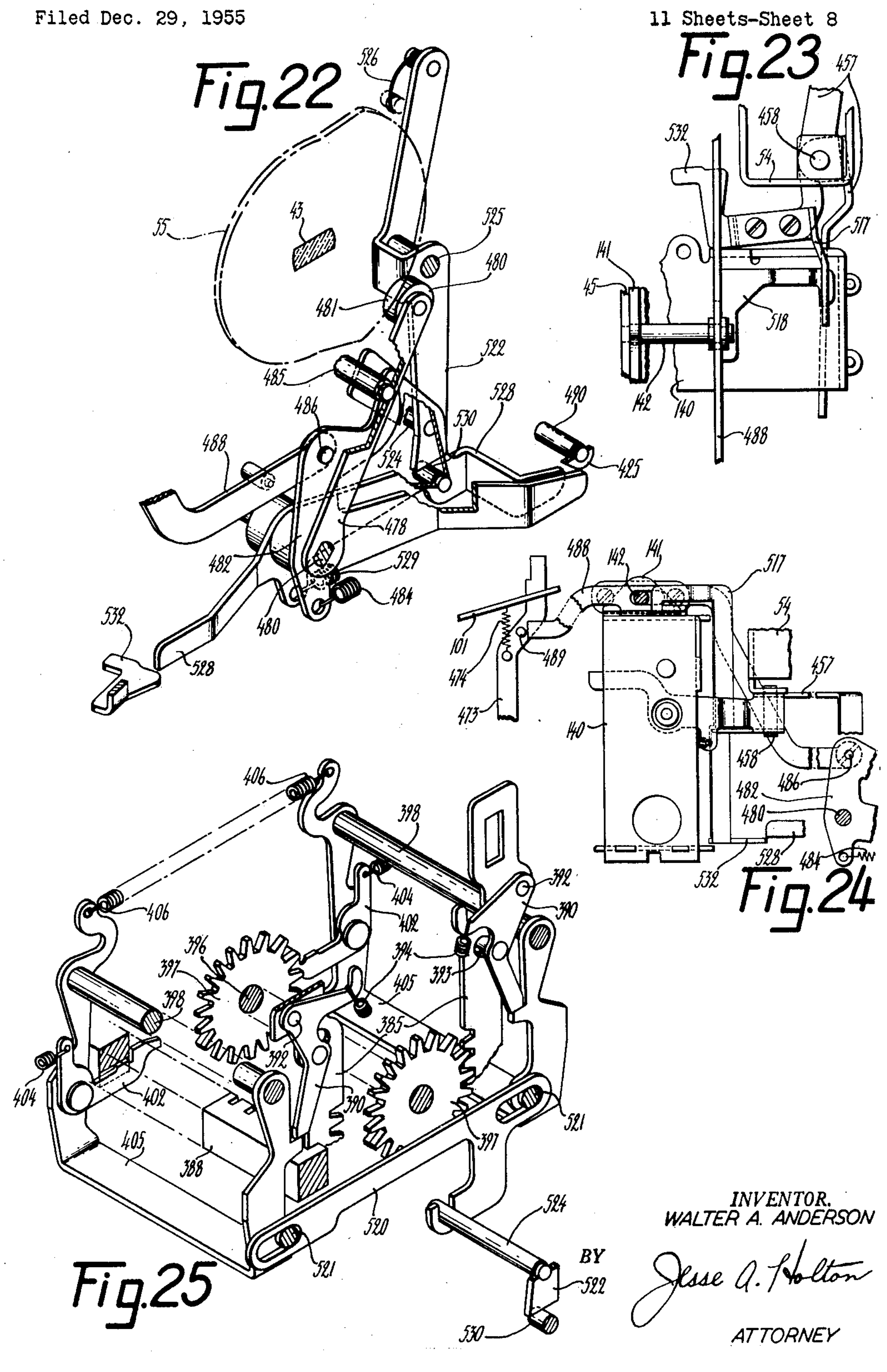
Figures 26, 27, 28:
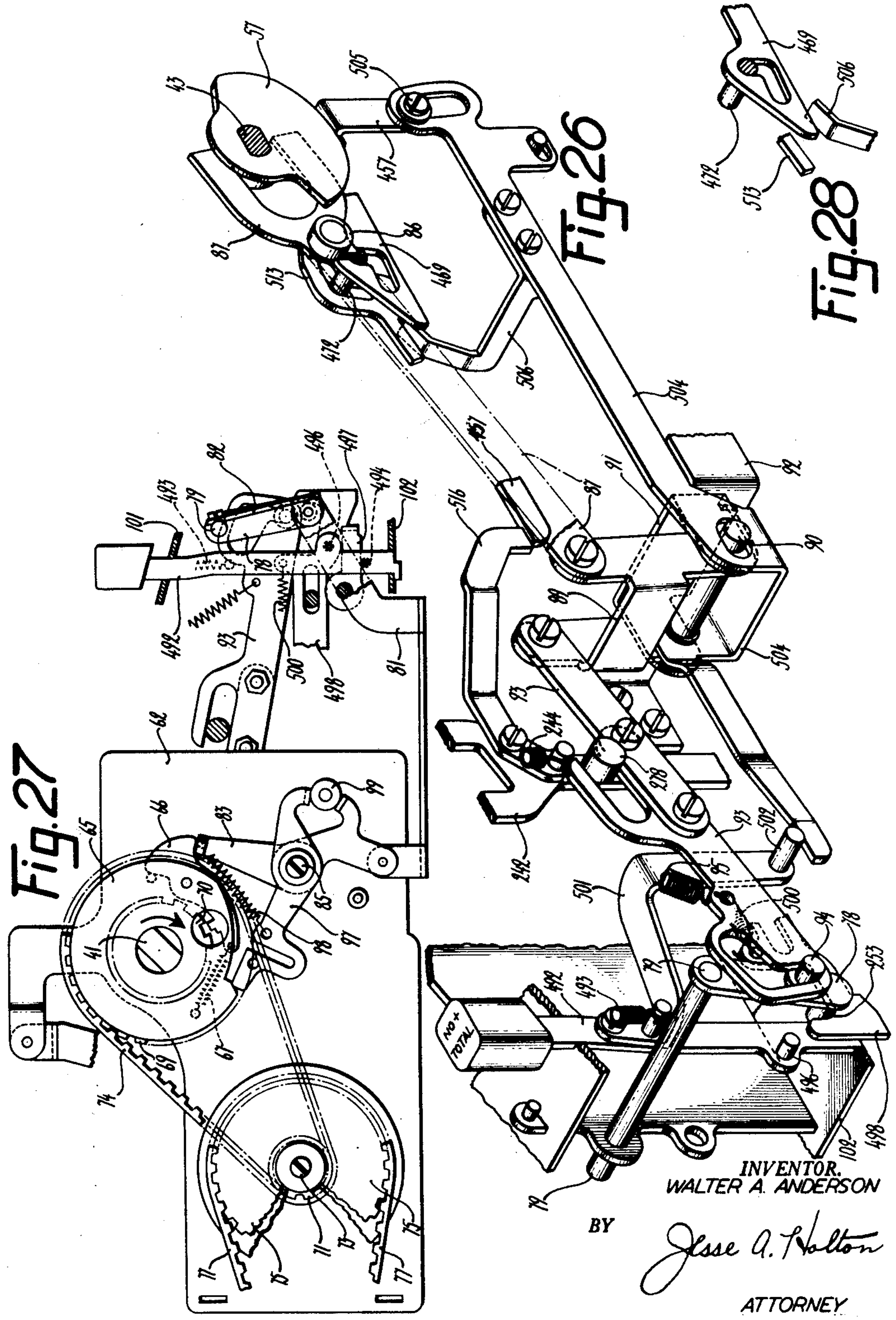
Figures 29, 30, 31, 32, 33, 34, 35:
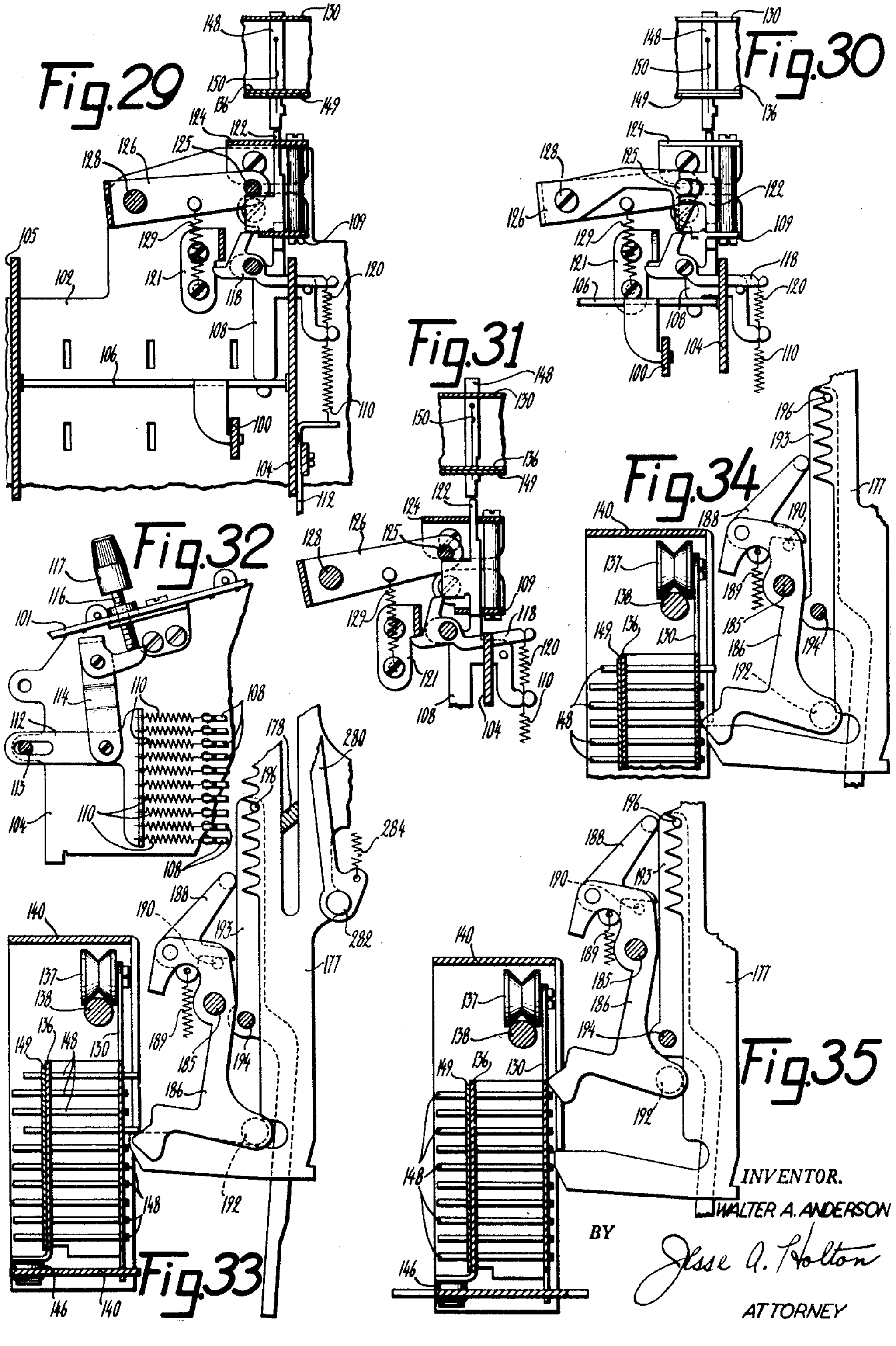
Figures 36, 37, 38, 39, 40:
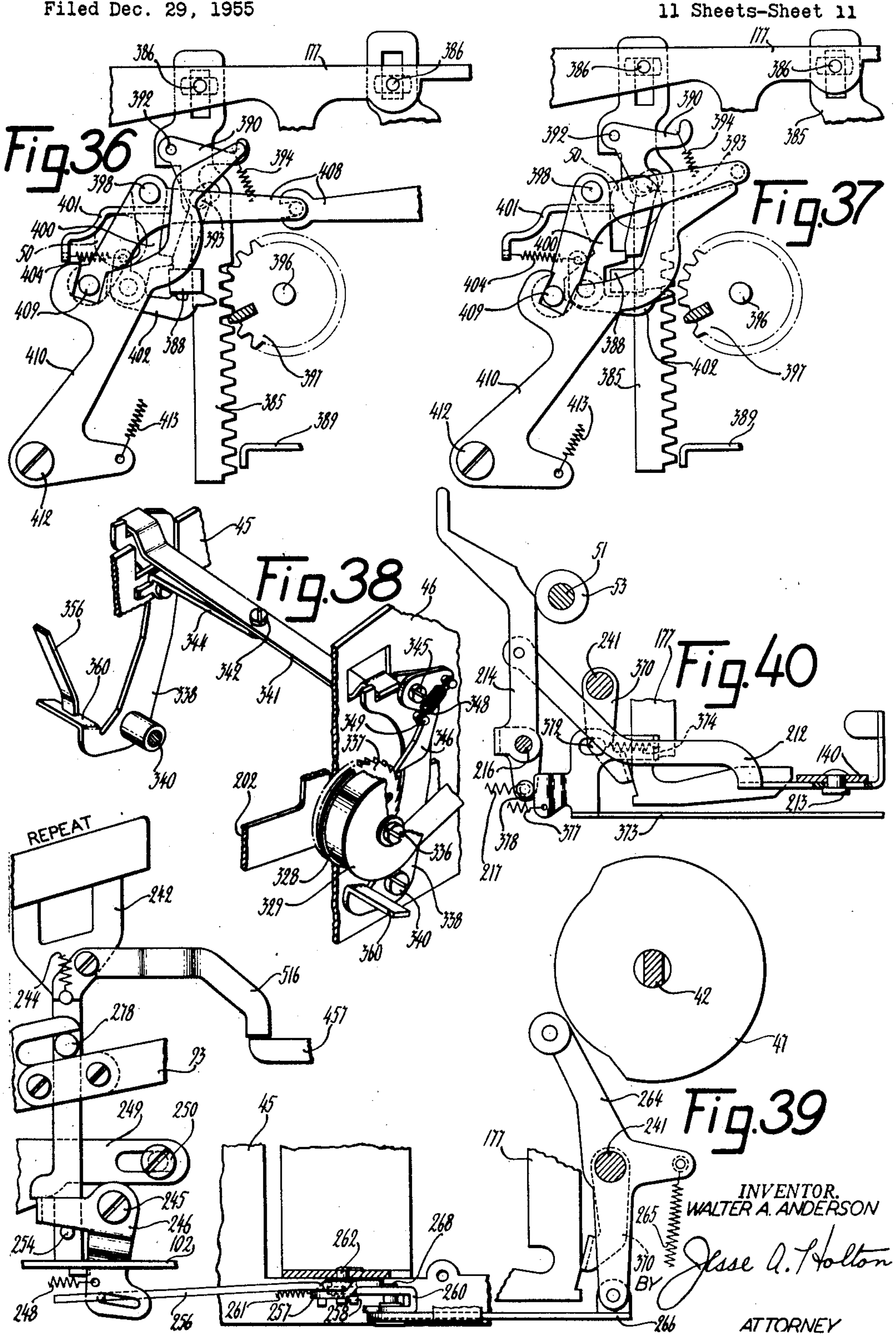

Figure 4 is a right side elevation of the machine with the register control cams removed, Figure 5 is a top sectional view showing the key lock, pin carriage restoring mechanism and the machine drive shaft, Figure 5A is a detail view of the left end of the drive shaft which was omitted from Figure 5, Figure 6 is a sectional view showing the repeat mechanism effective to prevent restoration of the set pins during a machine cycle, Figure 7 is a left front perspective of the pin carriage mechanism, Figure 7A is a perspective view of the back space mechanism for the pin carriage, which mechanism is hidden in Figure 7, Figure 7B is a detail of the lock to prevent vibration of the pin carriage of Figure 7 during repeated item entries, Figure 8 is a top sectional view showing the back space mechanism resetting a set pin, Figure 9 is a left section showing the 0 stop plate for the unindexed denominational orders in the normal position, Figure 10 is a view similar to Figure 9 but showing the 0 stop plate set to arrest the type bars for the unindexed denominations, Figure 11 is a right side view of the register actuating mechanisms, Figure 12 is a right side view of the mechanism to condition the register for subtraction and credit totals or subtotals, Figure 13 is a perspective detail view of the shifting mechanism for the register, Figures 14 to 21 are detail views of the register engaging mechanism shown in Figure 11 in various operating conditions wherein, Figure 14 shows the engaging mechanism with the register disengaged shortly after the start of a cycle, Figure 15 is the position about mid cycle when the register is moved to engage the actuators, Figure 16 is a top view of some parts of Figure 15, Figure 17 is a view similar to Figure 15 but with the machine set for non-addition, Figure 18 is a view showing the register mechanism engaging during a total cycle, Figure 19 is a plan view of the cams and followers as in Figure 18, Figure 20 shows the register disengaging devices for total cycles, and Figure 21 is a view similar to Figure 20 but showing the register disengaging devices disconnected to leave the register in engagement for a sub-total, Figure 22 is a perspective view showing the mechanism to control engagement of the register for subtraction and credit totals, Figure 23 is a plan view of the control by the pin carriage over the sensing arms of Figure 22, Figure 24 is a side view of the mechanism of Figure 23, Figure 25 is a perspective detail view of the "Fugitive One" mechanism of the register, Figure 26 is a detail perspective showing of the total controls and the control key restoring mechanism, Figure 27 is a left side view of the cycling clutch omitted from Figure 3, Figure 28 is a detail of Figure 26 showing the parts set for a non-add cycle, Figure 29 is a plan view of the key operated index pin setting mechanism in the normal position, Figure 30 is a view similar to a portion of Figure 29 but with the parts in an operated position, Figure 31 is also a view similar to Figures 29 and 30 but showing the parts in the released position with the digit key held depressed, Figure 32 is a right side view of the touch adjustment device for the keyboard, Figure 33 shows the differential mechanism arrested by a set stop pin and disengaging from the actuator to reset the stop pin, Figure 34 is the same structure as Figure 33 but with the actuator released from the differential bar, Figure 35 is the same structure as seen in Figure 34 but with the actuator restoring the 9 pin used as an escapement control, Figure 36 is a right side view of the tens transfer mechanism as tripped by a lower order register wheel, Figure 37 is a view similar to Figure 36 but with the transfer trip pawl relatched and the register disengaged at the start of a following cycle, Figure 38 is a perspective view showing the reversing mechanism for the inked ribbon, Figure 39 is a right side view of the item repeat key and the mechanism controlled thereby and, Figure 40 is a left side view of the mechanism to operate the 0 stop bail and the 0 stop plate for the unindexed differential bars.

GENERAL DESCRIPTION

The embodiment described in this application is a printing adding machine designed for relatively high speed and in which positive movements to reduce the timing tolerances common to spring operated devices are utilized as far as is practical. The driving mechanism is rotary to eliminate the complexity involved in an oscillatory type where some parts must be operated in only one direction of movement, or sometimes in opposite directions at different times. A rotary drive mechanism also enables all of the main power parts to be placed in a line and simplify assembly and repair in addition to reducing the number of parts used.

The rotary drive is controlled by a number of cycle keys, each of which releases a spring driven slide to set the function controls and starts a motor cycle to actuate the machine. Such a construction lightens the work load on the keys and permits the function keys to be operated by a uniform pressure, not radically different from that required for the digit indexing keys.

The digit keys, 10 in number for a decimal machine, each operate to set a stop pin in a traveling pin carriage and all keys act through a common connecting member to simultaneously set the topmost or 9 pin which is, in addition to being a stop for a differential member, also the stop for an escapement mechanism so that the pin carriage is released for an indexing step when any key is operated. The pin setting connections from each key are driven by a displaceable lever connected to the digit key and shifted to an inoperative position as the key depression is completed. The connections then fully restore and a second digit key may be operated during return of the first key or even if the first key stays depressed. Such a construction enables the indexing of an item as fast as the operator can depress the keys.

After an amount is indexed and a machine cycle started, the differentially moved actuator bars are positively raised to contact the set stops. The set stop will then arrest the actuator bar and continued movement of the actuator bar drive member will disconnect it from the actuator bar and lock the bar in its set position. In its further movement the drive member will reset the set index pin and the 9 pin to their original positions in the pin carriage so that at the mid cycle point all of the pins have been reset. The pin carriage may now be restored to its home position and since no stops are to be reset during such movement, there is no need for the usual restoration of the carriage through the home position to reset the last row of stops and then a return movement of the carriage to the home position. Consequently as soon as the actuator bars and drive members are restored to their 0 position, the keys may be reoperated to set a new amount during the remaining part of the machine cycle.

When it is desired to repeatedly enter the same amount, a repeat key is operated to cause the pin carriage to be shifted just far enough to shift the stops out of alignment with the drive members so that the stops are still effective to arrest the upward movement of the actuator bars but are not reset by the drive members.

The printing of an indexed amount is done by a group of type blocks, one connected to each actuator bar for setting to a printing position with reference to a platen. As the drive members raise the actuator bars, they simultaneously move a hammer restoring bar from a group of printing hammers which, however, remain cocked until the drive members are raised to their highest position where such hammers as are to fire are released to drive their type blocks against the platen. The hammers are restored to a latched position by the drive members during their restoration.

A register is selectively engageable with either of two groups of rack bars connected to the actuator bars to enable additive or subtractive entry of an indexed amount into the register during the return of the actuator bars to their normal position. A transfer device controlling each rack will normally stop each rack at a 0 position but is operable by the register wheel of the next lower denomination to release the rack for an extra, tens transfer, movement. The register is also engageable with the racks at the 0 position during their upward movement and will be rotated backwardly until the register wheels are individually arrested by the tens transfer devices to stop the type blocks at total printing positions. As the transfer device to arrest the wheels in total cycles may have been released on a preceding cycle, these devices are reset prior to the engagement of the register with the racks at the 0 position and therefore, the transfer stop on the racks is made yieldable to avoid interference.

DETAILED DESCRIPTION

*Machine cycling mechanism*

(Figs. 3, 4, 5, 5A, 11, 12, 22, 26, 27, and 39)

All of the functions of the machine are powered by a group of three concentric rotary shafts 41, 42, and 43, Figures 5 and 5A. The middle shaft 42 is rotatable in bearings in the right machine sidewall 45 and in the left sidewall 46. Secured to the right end of shaft 42 is a repeat cam 47, see also Figures 4 and 39, having a crank pin 49 with a cam roller 50 rotatable thereon, fixed to the repeat cam 47. Secured to the left end of shaft 42 is a key lock cam 52 with a crank arm 51 and cam roller 53 mounted thereon similar to those on cam 47.

Shaft 43 is rotatable in a right auxiliary frame 54 secured to the right sidewall 45 and has secured thereto a subtract cam 55 at its left end, see Figures 12 and 22, and a cycle restore cam 57, at its right end, see also Figure 26. Subtract cam 55 has a hole near its periphery to receive the squared end of crank pin 49 to couple the shafts 42 and 43 together for rotation.

Slidable but not rotatable on the middle portion of shaft 43 is a collar 58, Figures 5, 11, and 14 to 21, having a disengage cam 59 and a total cam 61 either formed as a part of the collar 58 or secured thereto.

The left shaft 41 is freely rotatable in a left auxiliary bracket 62 secured to the left sidewall 46 and has secured to it at its inner end, a pin carriage restore cam 63 having a square hole to receive the end of crank pin 51, see Figure 5A. Fixed to the left end of shaft 41, Figure 27, is a clutch plate 65 having a clutch dog 66 pivoted thereon and urged clockwise by a spring 67 between the dog 66 and plate 65. Freely rotatable on shaft 41 between clutch plate 65 and sidewall 46 is a pulley 69 having a toothed hub 70 with which clutch dog 66 is engageable under the pull of spring 67. A second pulley 71 free on a stud 73 in bracket 62 is connected to pulley 69 by a belt 74 and is secured to a third pulley 75 driven by a belt 77 connected to any suitable power source, as an electric motor.

The three shafts 41, 42, and 43 rotate as a unit due to the interconnecting crank pins and in effect constitute a single shaft which may, unless particularity is required, be hereinafter referred to as the main shaft of the machine. A cycle of operation of the machine consists of one revolution of shafts 41, 42, and 43 and may be initiated by operation of any one of the function control keys to be later described.

When any control key is operated, it causes the lower ends of the arms 78 and 82, Figure 27, secured to a shaft 79 near the front of the machine, to be moved rearwardly. A link 81 secured to an arm 82 at the left end of shaft 79 is thereby moved rearwardly to move the upper end of a clutch stop lever 83 pivoted on a stud 85 in auxiliary plate 62 and connected at its lower end to link 81, from under the tail of clutch dog 66. Spring 67 then pulls dog 66 clockwise into the teeth of the pulley hub 70 to enable pulley 70 to rotate clutch plate 65 and the main shaft clockwise.

Near the end of the cycle of the main shaft, the cycle restore cam 57, Figure 26, at the right end of shaft 43 contacts a roller 86 on an arm 87 to move the arm forwardly. Arm 87 is slotted at its rear end to slide on shaft 43 and is pivoted at its front end to an arm of a yoke 89 pivoted on a rod 90 in a bracket 91 fixed to a second bracket 92 secured between sidewall 45 and the right auxiliary frame 54. An inner arm of yoke 89 is connected by a link 93 having an inverted L slot to a pin 94 on the right arm 78 of shaft 79. A spring 95 connected to link 93 serves to hold the link clockwise in Figure 26 and tensioned toward the rear of the machine with pin 94 in the lower end of the slot in the arm. When link 87 is moved forwardly by cam 57, it will, through yoke 89 and link 93 rotate shaft 79, arm 78, Figure 26, link 81 and clutch stop lever 83 back to their normal positions where lever 83 will intercept clutch dog 66 at the end of the machine cycle and pull the dog out of engagement with hub 70 to terminate the cycle. Clutch plate 65 is prevented from rebounding when arrested by stop lever 83 by the engagement of a detent lever 97 pivoted on stud 85, with a notch in the periphery of plate 65. A spring 98 connected between stop lever 83 and detent lever 97 urges the levers counterclockwise and clockwise respectively to hold their other arms against a stop 99 fixed in bracket 62 and thereby retain them in their effective positions against the clutch dog 66 and clutch plate 65.

*Indexing mechanism*

(Figs. 1, 2, 5, 7, 8, and 29–32)

Figures 1, 2:
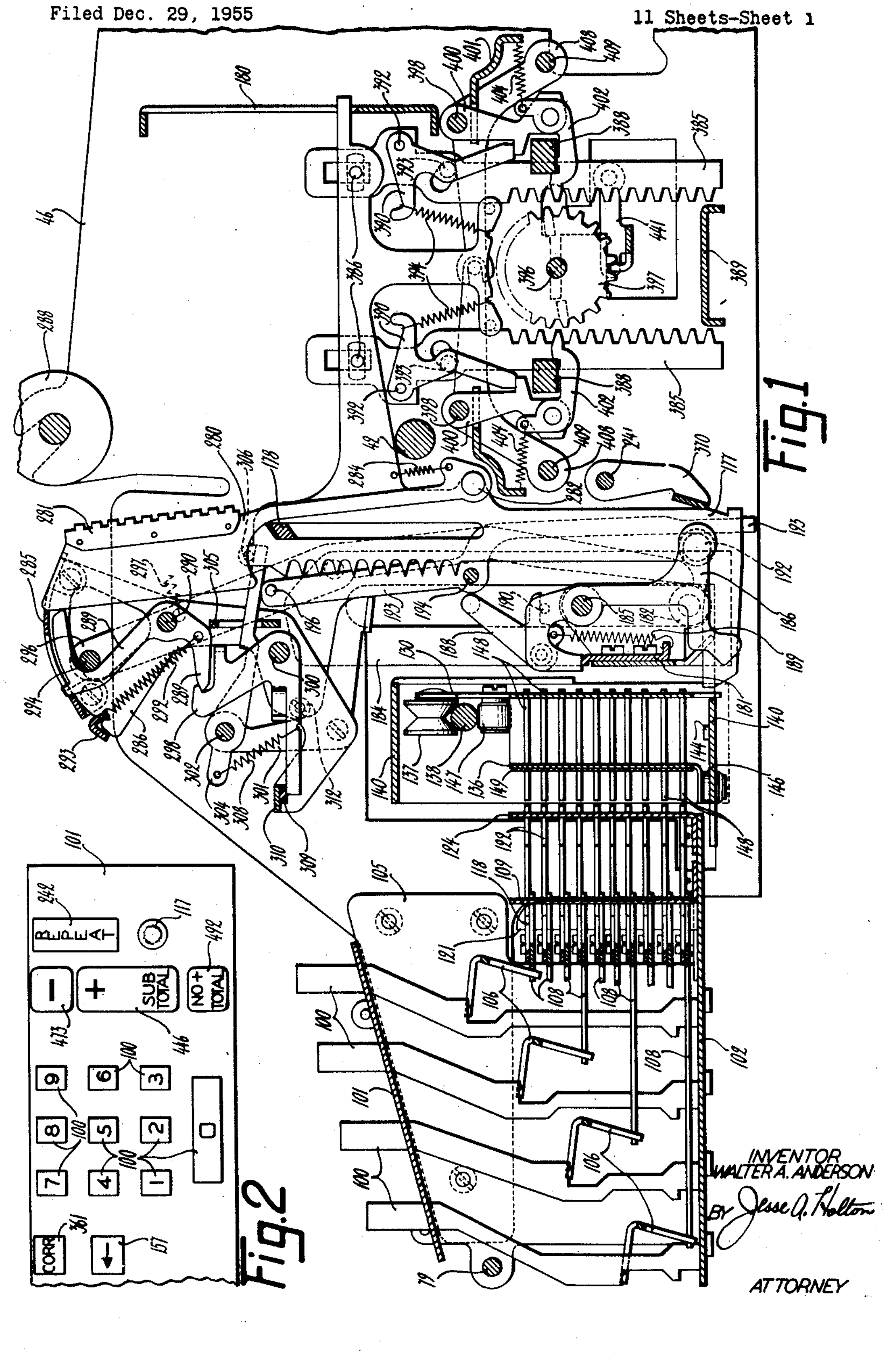
Figure 1 is a section view from the right side through the machine.
Figure 2 is a plan view of the keyboard of the machine.

Amounts to be entered into the adding machine are indexed by setting stop pins in a shiftable pin carriage by operation of a set of digit keys. The digit keys 100, Figures 1 and 2, are vertically slidable in slots in the top and bottom keyboard plates 101 and 102 secured to right and left keyboard sidewalls 104 and 105 respectively, see also Figure 29, fixed between forward extensions of the machine sidewalls 45 and 46. Pivoted in the sidewalls 104 and 105 are a plurality of bell cranks 106, one for each key 100, each bell crank 106 having a forward arm positioned under a shoulder of its key 100. A downward leg of each bell crank is connected to the forward end of a slide 108 slidable at its rear in a bracket 109 and having an ear projecting to the right through a slot in sidewall 104, Figure 29. A spring 110 connected between the ear of each slide 108 and a common plate 112, Figure 32, slidable on a stud 113 in sidewall 104 acts to move each slide 108 forward and holds its key 100 in an upper position.

The plate 112 is slidable to vary the tension exerted by the springs 110 on the slides 108 and to therefore adjust the pressure required to depress the individual keys 100. As shown in Figure 32, plate 112 is connected to one arm of a lever 114 pivoted on sidewall 104. The other arm of lever 114 is engaged by the end of a screw 116 held in a threaded hole in top plate 101 and having a head 117 for manual adjustment. As screw 116 is rotated to rock lever 114 clockwise, the plate 112 is moved forwardly to increase the pull of springs 110 which will increase the pressure required to depress the keys 100. A reverse rotation of screw 116 will reduce the key pressure and thus each machine operator may adjust the keyboard touch to her own preference.

Pivoted near the rear end of each slide 108 is a lever 118 having its right arm connected by a spring 120 to the ear of its slide 108 to normally hold the lever in its clockwise position of Figure 29. A left arm of lever 118 is spaced in front of a bracket 121 fixed to bottom plate 102 and a rear arm of each lever 118 is in front of a pin setting slide 122 slidable in bracket 109 and another bracket 124 on bottom plate 102. Each slide 122 except the topmost one for the 9 key 100 has an ear positioned in front of a universal bar 125 fixed in a bail 126 which is pivoted on a screw 128 in bottom plate 102 and tensioned clockwise in Figure 29 by a spring 129. The topmost slide 122 has a slotted ear embracing the top end of universal bar 125 and is not contacted by the rear arm of the lever 118 for the 9 slide 108, see Figure 30, but rather, the arm of lever 118 will contact a forward ear of bail 126 to rock the bail and thereby operate pin setter 122. Thus the top pin setter 112 will be operated when any key 100 is depressed.

As a slide 118 is moved rearwardly by depression of a key 100, the rear arm of lever 118 moves the aligned slide 122 with the slide 108 until the left arm of lever 118 contacts the bracket 121. Further movement of slide 108 causes lever 118 to rotate counterclockwise about bracket 121 and moves the end of the rear arm of lever 118 to the left out of engagement with the ear of slide 122 as indicated in Figure 31 where the arm of lever 118 is shown as just ready to leave slide 122. A slight additional movement of slide 108 will cause slide 122 to be released from lever 118 for immediate return to its normal position by bail 126 and spring 129. A second key 100 may now be depressed to operate a second slide 122 and will not be interfered with by the previously operated key 100 which will be restoring to the normal position. Thus the slide 122 will be fully operated and released during the depression of a key 100 and an operator need not wait for restoration of a depressed key before operating a second key.

Immediately to the rear of the slides 122 is a stop pin carriage having a plurality of columns of pins with 10 pins in each column. The pin carriage, as best seen in Figure 7, comprises a back plate 130, left, central, and right walls, 132, 133, and 134 respectively and a front plate 136 between the central wall 133 and the right wall 134. The rear wall 130 has two grooved rollers 137, only one being shown in Figure 7, and two cylindrical rollers 139 on its upper edge which rollers 137 roll on a rod 138 fixed in a slidable frame 140 to support the pin carriage for sliding in the frame 140. Frame 140 passes through holes in the sidewalls 45 and 46 and is free to move slightly therein between positions wherein one of a pair of brackets 141 secured to its top surface and having holes through which pass pins 142 secured to the sidewall 45 or 46, abuts the adjacent sidewall. Additionally an ear 144 on each sidewall 45 and 46, see Figure 5, passes through a slot in the bottom of frame 140 to hold the bottom of frame 140 against front to back movement while a spring 145 connected between frame 140 and sidewall 45 urges frame 140 to its rightmost position. A roller 146 on the front plate 136 of the pin carriage, see also Figure 7, passes through a slot in the lower surface of frame 140 to guide the bottom of the pin carriage.

A plurality of pins 148 arranged in columns of ten pins each are slidable in slots in the pin carriage back plate 130 and in a guide plate 149 fixed to the front plate 136. These pins 148 are settable from a normal forward position to a rear position and are held in either position by a wire detent 150, see Figure 8. The pin carriage is urged to the left in frame 140 by a spring 152 connected between the left side of frame 140 and the pin carriage wall 134 but will be held in position by the engagement of an escapement lever 153 on frame 140 with an unset pin in the top row of pins 148. Escapement arm 153 is pivoted on a bracket 154 secured to the top of frame 140 and is tensioned clockwise by a spring 156 to hold its upper arm against a lug bent rearwardly from bracket 154.

The original position of the pin carriage will be as shown in Figure 7 with the upper left pin 148 engaged by escapement arm 153 and in this position, the left row of pins 148 will be directly behind the rear ends of the pin setters 122, Figure 29. When any key 100 is depressed, it moves rearwardly the associated pin setter 122 as above set out and for any digit key 0 to 8, will also move rearwardly the top pin setter 122. Such pin setter movement will shift the aligned pin 148 rearwardly to a set position and for the top pin 148 will move the pin rearwardly out of engagement with escapement arm 153, Figure 7, to free the pin carriage to the action of spring 152, which will move the pin carriage to the left until escapement arm 153 engages the next pin 148. As subsequent keys 100 are operated, the pin carriage is repeatedly stepped leftward as above to move the columns of pins 148 which have had stops set therein from alignment with the pin setters 122.

*Back spacing mechanism*

(Figs. 3, 7, 7A and 8)

When an incorrect digit key 100 is operated, it is necessary to restore the incorrectly set pin 148 and to move the pin carriage one step to the right. A back space key 157, Figure 3, slidable in upper and lower keyboard plates 101 and 102 and urged upwardly by a spring 158 carries a stud 160 engaged in a slotted arm of a bell crank 161 pivoted on the keyboard sidewall 105. The lower arm of bell crank 161 is pivotally connected to a link 162 extending rearwardly and connecting to a lever 164, Figures 7 and 7A, pivoted on frame 140. As key 157 is depressed, link 162 is pulled forwardly to pivot lever 164 clockwise until it is arrested by a stop 165 on frame 140. During such movement of lever 164, a pawl 166 pivoted on the left arm of the lever 164 and tensioned by a spring 168 will engage in the teeth of a rack 169 and move the rack to the right. Rack 169 is secured to the bottom of the pin carriage and will carry the pin carriage with it a distance slightly greater than the horizontal distance between the centers of two columns of pins 148. Also during the movement of lever 164, its left arm contacts a link 170 pivoted at its right end on an arm of a resetting plate 172 and slidable at its left end on a stud 173 on frame 140. Plate 172 is pivoted on a post 174 fixed in frame 140 and will be swung counterclockwise by arm 164 acting through link 170. A spring 176 connected to plate 172 normally holds plate 172 in a clockwise position with the right end of the slot in link 170 against stud 173. There is a small clearance between the arm of level 164 and the left end of link 170 so that lever 164 through pawl 166 and rack 169 will have partially moved the pin carriage to the right before plate 172 is moved, thus insuring that the column of pins having the incorrect digit set therein shall be in front of plate 172. Plate 172 is moved to the position shown in Figure 8 and will reset all pins 148 including the top pin, in the column last indexed by a key 100. When the back space key 157 is released, springs 176, 168, and 158 restore the back space parts to their normal positions releasing the pin carriage which then moves to the left to abut escapement arm 153 by the reset top pin 148, thereby returning the pin carriage to the condition it was in prior to the depression of the incorrect digit key 100.

*Denominational actuators*

(Figs. 1, 3, 4, and 33–35)

After an amount has been indexed by setting pins 148 in the pin carriage, the set pins 148 are used to control the vertical excursion of a set of actuator bars 177. Each actuator bar 177 is vertically movable to the rear of the pin carriage plate 130 on a guide bar 178, which is in a slot in each actuator bar 177, and have rearwardly extending tails guided in slots in a comb 180 between sidewalls 45 and 46. The actuator bars 177 are spaced apart a distance equal to that between the columns of pins 148 and are positioned so that as any column of pins 148 is released from escapement arm 153, the step of the pin carriage will bring that column into lateral alignment with the rightmost actuator bar 177. Each actuator bar 177 has a foot extending forwardly from its lower end into vertical alignment with any set pin 148 and each bar 177 is notched with a plurality of notches at its upper front edge.

An actuator carriage 181 is vertically movable between the pin carriage and actuator bars 177 and has rollers 182 at each end, see Figures 3 and 4, by which it is guided in slots in plates 184 fixed to each sidewall 45 and 46. A shaft 185 passes through carriage 181 and extends through the slots in plates 184 to further guide the carriage 181. Freely rotatable on shaft 185 are a plurality of drive levers 186, see Figures 1 and 33–35, one to the right of each actuator bar 177 and each having a lower inverted T-shaped arm and an upper arm carrying an aligner actuator 188 pivotally connected thereto. A spring 189 connected between a lower arm of the actuator 188 and carriage 181 acts to hold actuator 188 clockwise in Figure 1 to normally press its arm against a pin 190 in its drive lever 186 and simultaneously to urge the drive lever 186 counterclockwise to hold a roller 192 at the lower rear of lever 186 in a notch in the front edge of an aligned actuator bar 177.

As carriage 181 moves vertically, the actuator bars 177 are carried along with it due to the engagement of rollers 192 in the actuator bar notches until the foot of the actuator bar 177 strikes an aligned set pin 148. Further movement of carriage 181 and actuator drive lever 186 cams lever 186 clockwise as shown in Figure 33 to move roller 192 out of the notch, freeing the actuator bar 177 from carriage 181. Just to the left of each actuator bar 177 is an aligner lever 193 pivoted on a fixed rod 194 in sidewalls 45 and 46 and having an aligning stud 196 fixed in its upper end. The lower arm of each aligner lever 193 is normally engaged by roller 192 to hold the aligner lever 193 in the position of Figure 1 but when roller 192 is cammed out of the actuator bar notch, the aligner actuator 188 engages the upper arm of lever 193 as shown in Figure 33 to rock the lever 193 clockwise and engage the aligner stud 196 in one of the notches in the upper edge of bar 177 as shown in Figure 33.

As roller 192 leaves the actuator bar notch, the forward end of the lower arm of lever 186 will be positioned under the set pin 148 which arrested the actuator bar 177 and upon further upward movement of carriage 181 will cam the pin 148 back to an unset position as shown in Figure 34. Drive lever 186 will remain in the rocked position with roller 192 running along the front edge of actuator bar 177 for its remaining vertical movement during which movement the top pin 148 will be reset to its initial position by drive lever 186 in the same manner as the lower pin 148. Thus as the carriage 181 reaches its upper position, all set pins 148 have been reset and all actuator bars 177 are held by studs 196 in an aligned position corresponding to the pins which arrested their upward movement as shown in Figure 35. During the return movement of carriage 181 to its lower position, drive lever 186 will first move freely until roller 192 moves into the actuator bar notch under the action of spring 189 and rocks the aligner lever 193 back into its Figure 1 position to free the actuator bar 177. The drive arms 186 then carry the actuator bars 177 downwardly with carriage 181 to the original position as in Figure 1.

The above movements are given carriage 181 by a pair of identical cam arms 197, see Figures 3 and 4, each pivoted outside one of the sidewalls 45 or 46 on a stud 198 and having a cam opening surrounding the roller 50 on the crank pins 49 described as part of the main shaft. The front end of each cam arm 197 is connected by a link 200 to an end of shaft 185 of the carriage 181. A link 201 connects each cam arm 197 to a ribbon lift lever 202 also pivoted on sidewalls 45 or 46 and to be later described, which levers 202 are urged counterclockwise in Figure 3 and clockwise in Figure 4 by springs 204, see also Figure 3A, to assist the hereinafter described rack bar springs in holding cam arm 197 up against roller 50. After a short dwell period of approximately 30° rotation of the main shaft after a machine cycle is started, roller 50 frees the cam arm 197 to move the carriage 181 and actuators 177 up to approximately a 0 position. After a short dwell of cam arm 197 at the 0 position, roller 50 starts to drive the arm to lift carriage 181 to its highest extent and differentially position actuators 177 as above described. Just before a mid-cycle position, carriage 181 reaches its upper position and dwells there for a short interval. Continued motion of roller 50 returns cam arm 197 and carriage 181 to restore the actuators 177 during the next quarter cycle to their normal position wherein they will be held by roller 50 during the last quarter cycle.

*Non-indexed 0 stop*

(Figs. 7, 9, 10, and 40)

Most of the items to be indexed in the pins 148 will have fewer denominations than the number of actuators 177 so that certain of the left side actuators will not have a stop pin 148 in arresting position. To prevent such actuators 177 from rising above their inactive 0 position, a 0 stop plate 205, Figure 7, is provided between the walls 132 and 133 of the pin carriage. This stop plate 205 is in alignment with the bottom row of pins 148 and is slidable between an actuator arresting position and a reset position. A plate 206 is pivoted between pin carriage walls 132 and 133 above stop plate 205 and has two ears engaging in slots in plate 205 to prevent skewing of stop plate 205.

A detent bail 208 is pivoted on a stud 209 in wall 132 and is urged by a spring 210, see also Figure 9, to bring a notched arm into engagement with an ear on plate 206 to hold the plate 206 and stop plate 205 in either the reset position of Figure 9 or the arresting position as shown in Figure 10.

Plate 206 and stop plate 205 are normally in the reset position of Figure 9 and are shifted to the Figure 10 arresting position at the start of a machine cycle by a slide 212, slidable on a stud 213, Figure 7, in the bottom of frame 140. The front end of slide 212 is bent into an ear which in the normal position of the pin carriage lies just to the left of the lower left end of plate 205 so that when the first column of pins 148 is indexed, the resulting step of the pin carriage will bring plate 206 behind the ear of slide 212. Slide 212 is actuated rearwardly at the start of an entry cycle by a lever 214 pivoted on a stud 216 in sidewall 46, see also Figure 40, and tensioned by a spring 217 to hold its upper arm to which slide 212 is connected, against the roller 53 on the left crank pin 51. Roller 53 will actuate slide 212 to set 0 stop plate 205 into the arresting position at the start of a machine cycle and will release lever 214 and slide 212 for restoration by spring 217 prior to the time actuators 177 reach their 0 position. Plate 205 will thereupon arrest all actuators 177 for which no pin 148 has been set, at the 0 position and will then be restored to the reset position by the continued movement of drive levers 186, Figures 9 and 10, in the same manner as the 0 pins 148 are restored.

*Restoration of the pin carriage*

(Figs. 3, 5, and 7)

After actuator drive carriage 181 has reached its upper position, all of the actuators 177 are differentially positioned and pins 148 and 0 stop plate 205 are reset as has been described. The pin carriage does not perform any function from this point on and may therefore be restored to its normal position during restoration of the drive carriage 181 and actuators 177. As shown in Figures 5 and 7, the pin carriage restoring mechanism is connected to the stud holding guide roller 146 on the front plate 136 of the pin carriage and includes a link 218 connected between the stud and a leg of a bell crank 220 pivoted on a stud 221 in the bottom keyboard plate 102. The other leg of bell crank 220 is connected to one end of a link 222 which has at its rear end a slotted bent up flange, see also Figure 3. A pin 224 fixed in the left auxiliary bracket 62 passes through the slot of link 222 to slidably support the rear end of the link. As pins 148 are indexed by keys 100, the pin carriage moves to the left in Figure 5 and through bell crank 220 moves link 222 forwardly step by step.

Pivoted on a stud 225, Figure 3, in auxiliary frame 62, is an arm 226 tensioned counterclockwise by a spring 228 to press a roller 229 on the arm 226 against the restoring cam 63. A cam 63 rotates clockwise in Figure 3 roller 229 of arm 226 rides on the concentric surface until about mid-cycle when the actuators 177 are all differentially positioned and all pins 148 have been reset. During the next quarter cycle, cam 63 rocks arm 226 clockwise to bring a roller 230 on the end of the arm 226 against the edge of the flange of link 222 and restore link 222 rearwardly and through bell crank 220, restore the pin carriage to its home position. Since there is no need to reset any pins 148 during this movement, the pin carriage is not given the usual excess movement beyond the home position but is stopped just as the escapement arm 153, Figure 7, which has ratcheted over the reset top pins snaps behind the last pin 148 to hold the carriage set in position. With this type of movement, it is not possible, as it is in conventional machines, to operate a digit key 100 during the time the pin carriage is moved past its home position and thus index an amount incorrectly by failure to index the first digit of the amount. During the last quarter cycle of cam 63, arm 226 is released fast enough to permit escapement of the pin carriage faster than any operator can index an amount so that there will be no interference with movement of the pin carriage.

*Digit key lock*

(Figs. 3 and 5)

The digit keys 100 are prevented from operating during a machine cycle until the pin carriage is restored as described above and the actuators 177 are returned to about their 0 position by a key lock plate 232, Figure 5, slidable under the bottom key plate 102 on studs 233. Lock plate 232 is tensioned forwardly by a spring 234 between a pin 236 on the lock plate and the forward stud 233 to move under the lower end of all digit keys 100 and all of the function keys of the keyboard except the repeat key to prevent depression of any key and to hold down an operated key. Lock plate 232 is held from such locking movement by an arm 237 pivoted on the right stud 233 and having a slot about pin 236. The left end of arm 237 is connected by a link 238 to a lever 240 pivoted on a stud 241 in the left sidewall 46, see also Figure 3, to bear with its bent off ear against key lock cam 52 under the influence of spring 234. Immediately after a machine cycle is started, the sharp corner of cam 52 moves from the ear of lever 240 to permit spring 234 to move lock plate 232 forwardly to lock the keys against depression. It will be noted, Figure 3, that the bottom end of all keys is formed with a small rearwardly extending lug which engages the bottom of plate 102 to limit the upward movement of a key. When any function key except the repeat key is operated to initiate a machine cycle, lock plate 232 will engage over this lug on the key to hold the key down until the other keys are unlocked. If a digit key 100 happens to be held depressed during a machine cycle, this key 100 will also be retained depressed but this will not cause any damage as the key slide 108 is released from the pin setter 122 when the key 100 reaches its full depression and there will be no interference between the pins 148 during return of the pin carriage and the pin setters 122.

The key lock plate 232 will be retained in the locking position until approximately 270° of the machine cycle at which time the pin carriage is fully restored by restore cam 63 and the actuators 177 have their feet about at the level of the lowest row of pins 148. At this point, the rise of cam 52 will engage the ear of lever 240 to shift the lever 240, link 238, arm 237 and lock plate 232 back to the unlocking position of Figure 5 whereupon the digit keys 100 may again be operated to enable at least a partial indexing of a new amount prior to the end of the machine cycle.

*Item repeat mechanism*

(Figs. 5–7, 11, 26, and 39)

An item repeat machine cycle is one in which the pins 148 are not reset to their initial positions during a machine cycle nor is the pin carriage returned to its home position so that the set up item may be retained indexed to control actuators 177 during a subsequent machine cycle. Such an item repeat cycle is initiated by depression of a repeat key 242, Figures 2, 26, and 39, slidable in keyboard top and bottom plates 101 and 102 and urged upwardly by a spring 244, Figure 39. Pivoted on a stud 245 in the right keyboard side wall 104 is a bell crank 246 urged clockwise by a spring 248 to retain a belt off ear on the forward arm of the bell crank 246 under a shoulder of key 242. The bent off ear of bell crank 246 is, in the normal position of key 242, engaged by a shoulder of a slide 249 movable rearwardly on studs 250 in sidewall 104 under the pull of a spring 252, Figure 4. The forward end of slide 249 is formed with an arm extending upwardly in front of a pin 253 on arm 78 previously described. When key 242 is depressed, it rocks bell crank 246 counterclockwise to move the ear of bell crank 246 below the shoulder of slide 249 whereupon the slide 249 is moved rearwardly by spring 252 to rock bell crank 246 further by the cam surface on slide 249 immediately in front of the shoulder. A pin 254 on key 242, Figure 39, engages the bottom keyboard plate 102 to limit depression of key 242. The forward arm of slide 249 rocks arm 78 as the slide 249 moves rearwardly to release the clutch dog 83, Figure 27, of the machine clutch to initiate a cycle of the main shaft as described under the heading "Machine Cycling Mechanism."

When bell crank 246 is rocked by key 242 and slide 249, its lower arm, which extends through the lower keyboard plate 102 and is slotted, pushes rearwardly a a wire 256 having a bent portion engaged in the slotted part of the bell crank 246. Wire 256 is connected at its rear end to the right arm of a lever 257, see also Figure 5, pivoted on a stud 258 in an arm of a bell crank 260 and urged clockwise by a spring 261. The rearward motion of wire 256 rocks lever 257 counterclockwise to position the left arm of lever 257 in alignment with a stud 262 fixed to the lower surface of frame 140 as shown in Figure 6.

Shortly after the start of a machine cycle and before the actuators 177 are raised above their lowest position, the repeat cam 47, Figure 39, rocks a lever 264 rotatable on the right end of shaft 241, counterclockwise against the tension of spring 265 to move rearwardly a link 266 connected between the lower end of lever 264 and bell crank 260. Bell crank 260 is thereby rocked clockwise about its pivot pin 268 in the right auxiliary frame 54 to move lever 257 leftward against stud 262 on frame 140 and carry the frame 140 to the left into the Figure 6 position where the set stops 148 are in the path of movement of the feet of actuators 177 and hence are still effective to arrest the actuators but are out of the path of the resetting cam surfaces on the drive levers 186 so that pins 148 will not be reset during a repeat cycle. In addition to this, the leftward movement of frame 140 is effective to disable the pin carriage restoring mechanism. Referring to Figure 5, a stud 269 near the left end of the bottom of frame 140 is engaged in a slotted forward end of a lever 270 pivoted on a stud 272 in the left auxiliary frame 62. A pin 273 in the rear end of lever 270 projects downwardly into a slot in restore link 222, a part of the pin carriage restoring devices described under the heading "Restoration of the Pin Carriage." When frame 140 is moved to the left it rocks lever 270 to pivot link 222 about its connection with bell crank 220 and move the flanged rear end of link 222 out of the path of movement of roller 230 to prevent the pin carriage from being restored to its home position during a repeat cycle. After the actuators 177 have been fully restored to their normal position, lever 264, Figure 39, is released by cam 47 to enable spring 265 and spring 145, Figure 5, for the frame 140 to restore the frame 140 and bell crank 260 to their normal positions.

During continuous machine cycling by the repeat key 242 for repeated entries of an item, the pin carriage due to its spring connection in frame 140 may vibrate or rebound which could cause an occasional error in an item entered. Such vibration is now eliminated by a wire 274, Figures 3, 7 and 7B, loosely held at its front end on a stud 276 in the left arm 82 of cycle trip shaft 79 and passing rearwardly through a hole in a bracket 277, Figures 7 and 7B on the pivot of back space lever 164 into alignment with the back space rack 169. When shaft 79 is rocked to initiate a machine cycle, wire 274 is moved rearwardly into the teeth of back space rack 169 to hold the pin carriage securely on frame 140. Wire 274 is removed from back space rack 169 when shaft 79 is restored to the cycle arresting position, which as will be pointed out, is very shortly before the pin carriage restoring mechanism can start the pin carriage moving toward its home position.

When the repeat key 242 is held down for a multiple entry of an amount, the machine will cycle at a higher rate if the cycle trip shaft 79, Figure 26, is held in the cycling position rather than being restored in every cycle by cycle restore cam 57 as has been described. To permit shaft 79 to be held in the actuated position by the repeat slide 249, Figure 39, so long as key 242 is held down, the cycle restore arm 93, Figure 26, is formed with a slot in which is engaged a stud 278 on key 242 so that arm 93 will be swung counterclockwise as key 242 is depressed. With arm 93 in this lower position, pin 94 will be in the horizontal part of the slot in arm 93 so that the reciprocation of arm 93 by the cycle restore cam 57 will not affect arm 78 or shaft 79. Slide 249 will not be reset to its forward position and the item repeat mechanism will remain in an active position to shift frame 140 leftward in each cycle as above described.

It will be seen from Figure 5 that the key lock plate 232 is cut away so that it does not latch key 242 down at any time and the key 242 will be raised to its upper position by its spring 244 and spring 95 on arm 93 without reference to the position of key lock 232. Referring again to Figure 26, after a machine cycle is initiated by repeat key 242, arms 93 and 87 will be in a rearward position with roller 86 following the surface of cam 57. If repeat key 242 is now released, pin 94 is in line with the vertical part of the slot in arm 93 and key 242 and arm 93 will be immediately lifted to the normal upper positions. During the third quarter of that machine cycle cam 57 will drive link 87 and arm 93 forwardly to shift arm 78, shaft 79 and repeat slide 249 back to their normal positions where they will be latched by bell crank 246 and will retain them there until just before the end of the cycle. Wire 256, and lever 257, Figure 39, will not follow bell crank 246 in its return to latching position, and will, as permitted by the slot through which wire 256 passes, be frictionally held in their active positions by the engagement of lever 257 with stud 262 on frame 140. When lever 264 is released by repeat cam 47 to shift lever 257 to the right near the end of a machine cycle, wire 256 and lever 257 are free to be moved back to their normal positions by spring 261.

If release of key 242 is delayed until after the mid-cycle point, cam 57, Figure 26, will have moved arm 93 forward and pin 94 will be in the horizontal part of the slot of arm 93. This pin 94 will then prevent arm 93 and key 242 from return to normal position until cam 57 releases roller 86 and arm 93 at the end of that machine cycle at which time spring 95 shifts arm 93 rearwardly bringing the vertical part of the slot into line with pin 94 whereupon arms 93 and key 242 will restore to their upper positions. As arm 78 and slide 249 remain in their set positions, the machine continues for another cycle during which arm 93 will again be shifted by cycle restore cam 57 to then reset arm 78 and slide 249 to the restored positions. Thus, a momentary depression of key 242 will initiate a single machine cycle during which the pins 148 and the pin carriage will be retained in their indexed postion but a retention of key 242 in the depressed position until after the mid-cycle time will cause a second repeat cycle to follow. Broadly, release of key 242 before the mid point of a cycle will arrest the machine at the end of that cycle but release of the key 242 after that time will not cause arrest of the machine until the end of the succeeding cycle.

*Printing mechanism*

(Figs. 1, 3 and 4)

A printing mechanism to make a permanent record of the items indexed into the pin carriage and controlling the movement of the actuators 177 is mounted between the sidewalls 45 and 46 above the actuators 177. Referring to Figure 1, a type bar 280 carrying a block of type 281 is pivotally mounted on a stud 282 in each actuator 177 and is urged counterclockwise in Figure 1 by a spring 284 between it and its actuator 177. The upper end of each type bar 280 is guided in slots cut in a comb plate 285 secured to the upper ends of a pair of plates 286, one fixed to the inner side of each sidewall 45 and 46 and spaced a short distance therefrom. The type bars 280 are movable in the slots of comb 285 and about their pivot 282 to bring the type blocks 281 against a rotatable platen 288 between the sidewalls 45 and 46. Platen 288 may be any of the types of platen generally used and serves to support a paper tape, not shown, between it and type blocks 281 to receive imprints thereon. Platen 288 may be equipped with the usual feed rolls, paper table, line space detent, tear off plate, etc., which devices form no part of the present invention and are, therefore, not particularly detailed in this specification.

After the actuators 177 have been differentially positioned under control of the set pins 148 to bring the type blocks 281 into position to print the indexed amount at the printing line on the paper tape about platen 288, the type bars 280 are driven against platen 288 in a printing movement by hammers 289 each individual to a type bar 280. The hammers are free to rotate on a shaft 290 between plates 286 and are individually urged clockwise by springs 292 connected between the hammers 289 and an anchor bar 293 in plates 286. Comb 285 is also slotted to receive projections on the upper ends of hammers 289 to guide the hammers 289 which hammers are normally retained in their Figure 1 position by a rod 294 passing to the rear of the hammers 289 and fixed in two levers 296 pivoted one on the outside of each sidewall 45 and 46. A spring 297 secured to each lever 296, see also Figures 3 and 4, tensions the top arm of lever 296 to the machine rear to hold a bent lower arm of each lever against the guide rollers 182 of actuator drive carriage 181 which in its lower position holds levers 296 and restoring bar 294 in the hammer restoring position of Figure 1. As carriage 181 moves upwardly during a machine cycle, rollers 182 are moved along the lower arms of levers 296 to free the levers to the action of their springs 297 and permit the restoring bar 294 to move rearwardly and free hammers 289.

Hammers 289 are not, however, free to follow rod 294 at this time for they are held by the engagement of a lower tail of each hammer 289 with a tooth of a hammer release bell crank 298, all of which bell cranks are pivoted on a rod 300 between the plates 286 and each of which has an ear bent off of a lower arm to overlap the lower arm of the bell crank 298 to the right so that when any bell crank 298 is rocked counterclockwise it will carry with it all bell cranks 298 to its right. A pair of levers 301 are pivoted one on the inside of each of the sidewalls 45 and 46 and are joined together by a rod 302 on which are mounted levers 304, one for each bell crank 298 and each having a rear arm passing through a guide comb 305 to underlie a pin 306 in the top of each actuator 177. A spring 308 between the forward arm of each lever 304 and the forward arm of its bell crank 298 acts to hold the forward arm of each bell crank 298 against a flexible pad 309 of a bar 310 joining the plates 286, to urge levers 304 counterclockwise and hold the rear arm of each lever 304 against its pin 306 and the springs as a group hold levers 301 clockwise against a stop 312 in the adjacent sidewall 45 or 46.

As the actuator bars 177 rise during a machine cycle, the pin 306 on each bar 177 frees its lever 304 to rotate counterclockwise under the action of its spring 308 and, when the foot of any actuator bar rises to the level of the second row of pins 148, representing a 1 printing position, pin 306 has released its lever 304 enough to bring a shoulder on lever 304 behind an ear bent off of each hammer release bell crank 298 which ear arrests further rotation of the lever 304. When actuator drive carriage 181 reaches its highest position at about mid-cycle, the tops of the carriage ends strike the rear arms of levers 301 to rock the levers counterclockwise and move all of the levers 304 to the front of the machine. For any actuator 177 which has risen to at least the 1 position, lever 304 has its shoulder behind the ear of its bell crank 298 and during such forward movement of lever 304, the bell crank 298 will be rocked to release its tooth from the hammer 289, freeing the hammer to the action of its spring 292 and driving type bar 281 against platen 288. Due to the overlapping ears on the bell cranks 298, each bell crank 298 when rocked as above to release its hammer 289 will rock all other bell cranks 298 to the right releasing all hammers to its right to cause printing from the rightward type bars 281 which have been arrested at the 0 position. Conversely the type bars 281 to the left of the leftmost actuator 177 which has risen above 0, will not have their hammers released when levers 301 are actuated and printing of the non-significant 0's from such type bars 281 will be suppressed.

The movement of the levers 296 and bar 294 will be reversed during the return of actuator carriage 181 to its normal position. Such reversed movement of levers 296 will bring the bar 294 back to its position of Figure 1 carrying with it the hammers 289 which have been released to cause printing from the type bars 281. Since the levers 301 are released by the initial downward movement of carriage 181, the bell cranks 298 are free to again latch over the tails of the hammers 289 and retain them in their cocked positions during a succeeding cycle until levers 301 are again rocked by carriage 181.

The hammer restoring movement of the left lever 296, Figure 3, is also used to rotate platen 288 one step counterclockwise to present a new portion of the paper thereabout for the next printing impression. A slide 313 has a slot near its rear end embracing a fixed pin 314 and in its forward end has a slot through which is passed the hammer restoring bar 294. In the rest position of the machine, the restoring bar 294 is at the forward end of its slot in slide 313 to hold the slide at its forward limit of travel. A projecting lug 316 at the rear of slide 313 engages a stud 317 on an arm 318 pivoted on the shaft 320 of platen 288 and urged clockwise by a spring 321. A pawl 322 is pivoted on arm 328 and is tensioned counterclockwise by a spring 324 connected between its rear arm and slide 313 to urge its forward pawl end into engagement with a ratchet wheel 325 secured to platen shaft 320. In the normal position of arm 318, a downwardly extending lug of pawl lever 322 contacts a fixed pin 326 to hold pawl lever 322 slightly clockwise and away from ratchet wheel 325. When hammer restoring lever 296 rocks the restoring bar 294 rearwardly during a machine cycle, slide 313 and arm 318 are freed to move under the drive of spring 321 and the initial movement of arm 318 moves pawl lever 322 from its engagement with pin 326 so that the pawl 322 may engage with and ratchet over the teeth of ratchet 325 during the clockwise movement of arm 318. On the restoration of slide 313 by bar 294 near the end of the machine cycle, lug 316 rocks arm 318 counterclockwise and pawl 322, then engaged in the teeth of ratchet wheel 325, will turn wheel 325 and platen 288 to advance the paper. The final movement of arm 318 will engage pawl 322 with pin 326 to free the pawl from ratchet wheel 325. It will be understood that conventional detenting devices and variable line spacing devices may be used in conjunction with this platen spacing mechanism to detent the platen against reverse rotation by pawl 322 and to control the engagement of pawl 322 with ratchet 325 to provide a more commercially acceptable machine.

*Printing ribbon mechanism*

(Figs. 3, 4 and 38)

An inked ribbon 328 is passed across the front of platen 288 between the type blocks 281 and the printing line on the record paper. The ribbon 328 will be wound from a spool 329 on a stud in ribbon lift arm 202, Figure 4, forward around a pin 330 in the end of arm 202, up and around an angled guide 332 and leftward across the front of platen 288. On the left side of the machine the ribbon 328 passes from the angled guide 332 down to pin 330 and back to be wound up on left spool 329. It will be remembered that ribbon lift arms 202 are connected by links 201 to the cam arms 197 and will be released to the action of their springs 204, Figures 3A and 4, as the arms 197 are driven. Each angled guide 332 is part of a link 333 connected to lift arm 202 by pin 330 and carrying a stud 334 movable in a slot in the adjacent sidewall 45 or 46 to guide the link 333. During upward movement of lift arms 202, the links 333 elevate ribbon 328 into the printing position between platen 288 and type blocks 281 and restore with the arms 202 to lower the ribbon for better visibility of the printed item.

Each ribbon spool 329 is freely rotatable on a pivot pin 336 secured in an arm 202 and engages with a ratchet wheel 337 also rotatable on pivot pin 336. A bell crank 338, see also Figure 38, is pivoted on a stud 340 in each sidewall 45 and 46 at a point slightly below and forward from each spool 329 and the two bell cranks 338 are connected together for opposite movement by a lever 341 having an arm engaging in a notch in the end of the upper arm of each bell crank 338. Lever 341 is pivoted at its center on a stud 342 midway between the sidewalls 45 and 46, in a bracket 344 fixed to sidewall 45 and connects the bell cranks 338 so that only one bell crank can have its upper arm in an active rearward position at any time. Pivoted on a screw 345 in the upper arm of each bell crank 338, is a ratchet pawl 346 urged by a spring 348 into engagement with a stud 349 in the bell crank 338. On the bell crank which is in its active position, ratchet pawl 346 will be engaged with the ratchet 337 as in Figure 3 and as the ribbon lift arm 202 raises ratchet 337 during a machine cycle, pawl 346 will force the ratchet 337 to rotate and turn spool 329 to wind up a section of ribbon 328. The other spool 329 will be free to rotate at this time and will have a section of ribbon 328 withdrawn from it.

Pivoted on a screw 350 in each lift arm 202 is a detent pawl 352, Figures 3 and 4, tensioned by a spring 353 to bring a bent off ear at its rear end into the teeth of its ratchet wheel 337 to prevent backward rotation of ratchet 337. A pin 354 in each bell crank 338 engages a tail projecting from detent 352 when the bell crank is in an inactive position, to rock the detent 352 slightly to the Figure 4 position and move the bent off ear of detent 352 from its ratchet wheel 337 so that ribbon 328 can be unwound from that spool 329.

When the ribbon 328 is substantially all unwound from one spool 329, it is necessary to switch the positions of the two bell cranks 338 so that the exhausted spool 329 will then be driven to wind up the ribbon again. This reversal of bell cranks 338 is controlled by a pair of ribbon sensing arms 356 each pivoted on a screw 357 on one of the lift arms 202 and tensioned by a spring 358 to bear against the ribbon 328 on the adjacent spool 329. When there is very little ribbon left on a spool 329, the lower end of the arm 356 sensing that spool moves against a bent off ear 360 of bell crank 338. During the next machine cycle, arm 202 is lifted to bring the lower end of sensing arm 356 over ear 360 so that when arm 202 is restored by cam arm 197, arm 356 will bear down on ear 360 to reverse the positions of the bell cranks 338 and enable motion of arms 202 to thereafter wind ribbon back on to the exhausted spool 329.

*Correction key mechanism*

(Figs. 3 and 40)

When an item is erroneously indexed in pins 148 and it is desired to completely remove this item from the machine, a correction key 361, see also Figure 2, is operated. This key 361 is, as shown in Figure 3, slidably mounted in upper and lower keyboard plates 101 and 102 and is held in an upper position by a spring 362. Key 361 has two spaced ears near its lower end between which is held a bent off ear of a bell crank 364 pivoted on a screw 365 in left wall 105 of the keyboard. The ear of bell crank 364 is engaged behind a shoulder of a slide 366 urged rearwardly by a spring 368 but normally held in a forward position on guide screws 369 by the engagement of the ear of bell crank 364 with the shoulder. The forward end of slide 366 has an ear extending upwardly in front of pin 276 on cycle trip arm 82 so that when key 361 is depressed to rock bell crank 364, slide 366 is released to rock cycle trip shaft 79 and initiate a machine cycle as has been set out. During such a machine cycle, the actuator drive levers 186, Figure 1, reset any set pins 148 to their unset positions and restore cam 63, Figures 5 and 5A, restores the pin carriage to its home position thereby removing the erroneous item from the indexing mechanism.

As the item is, in this instance, an erroneous one, it should not be printed on the record tape. Since at least one actuator 177 must move about its 0 position before any printing hammers will be released, an item will not be printed if all actuators 177 are arrested at their 0 position. The actuators 177 may be stopped at 0 by a 0 stop bail 370 having two arms secured to shaft 241, see also Figures 1 and 40, and a stop blade between the arms and passing just to the rear of actuators 177. A pin 372 on the left arm of bail 370 passes through the left sidewall 46 into a slot in the rear end of a link 373, Figure 3, and is connected by a spring 374 to an ear of link 373 to hold pin 372 in the forward part of the slot. Link 373 is supported at its forward end by a pin 376, Figure 3, which passes through a slot in a lower arm of bell crank 364 for the correction key 361. Link 373 is tensioned rearwardly by a spring 377, see also Figure 40, at its rear end to hold pin 376 near the rear end of the slot of bell crank 364 and to hold the rear of the link 373 against a pin 378 in the bottom of lever 214 previously described under the heading "Non-Indexed 0 Stop." When key 361 is depressed the rocking of bell crank 364 will, after a short idle movement, move link 373 forwardly to tension the 0 stop bail 370 counterclockwise against actuators 177. When the actuators 177 rise during the ensuing machine cycle, bail 370 will move into a notch in the actuators to arrest them at their 0 position. The set pins 148 and the pin carriage will be restored in the normal manner and actuators 177 will be returned to their rest position at about the three-quarter point of the machine cycle. Key 361 has a lug formed on the bottom end which lug will be engaged by the key lock slide 232, Figure 5, to lock key 361 in its depressed position until the actuators have been fully restored as has been set out.

As no actuators 177 have risen above the 0 position in the correction cycle, no printing hammers 289 are released for printing on the record tape and to avoid a blank space on the tape, the platen line spacing mechanism is disabled by the correction key 361. As has been set out, the platen 288 is line spaced by movement of a slide 313, Figure 3, and this slide 313 will be blocked when key 361 is depressed. A lever 380 pivoted on a screw 381 in the left side plate 46 has a forward slotted arm engaging a stud 382 on key 361 and has a bent off ear on its rear arm engageable behind a lug 384 of slide 313. When key 361 is depressed, lever 380 is rocked to place its ear behind lug 384 to prevent movement of slide 313 during the machine cycle and thus prevent line spacing of platen 288 by slide 313.

*Registering mechanism*

(Figs. 1, 13, 25, 36 and 37)

Referring to Figure 1, each of a plurality of pairs of rack bars 385 is slidably held on one of a pair of spaced studs 386 fixed in the rear extension of each actuator bar 177. Each rack passes through a cut in one of two bars 388 fixed between the sidewalls 45 and 46 and the two racks of a pair are separated at their lower ends by a fixed spacer plate 389 also between the sidewalls 45 and 46. Each rack bar 385 carries a stop arm 390 pivoted on a rack bar stud 392 and provided with a pin 393 passing through a slot in the rack bar. A spring 394 connected between an inner arm of each stop arm 390 and a central projection of the arm of the actuator 177 to which the arm 390 is connected urges the inner arms of the arms 390 downwardly to hold pin 393 in the outer end of the slot in its rack bar 385 with a tail of the stop arm 390 projecting to the outside of the rack bars 385.

A shaft 396 carries a plurality of toothed register wheels 397, one for each actuator 177 and pair of rack bars 385, between the racks 385 and is horizontally slidable in slots in the sidewalls 45 and 46 to engage the register wheels 397 with either the front group or the rear group of rack bars 385. Each register wheel 397 has, in this case, twenty teeth with two diametrically opposed tens transfer teeth inset to the left of two of the teeth. Freely rotatable on rods 398 are a plurality of tens transfer arms 400 one for each rack 385. Each transfer arm 400 is guided in a fixed comb plate 401 to hold a projection of the transfer arm under the lower end of the stop arm 390 of the adjacent rack bar 385 and at its lower end has a transfer pawl 402 pivotally connected thereto. Each transfer pawl 402 has a lower arm projecting toward the register wheels 397 and an upper arm connected by a spring 404 to comb plate 401, the spring acting both to urge the lower arm of the pawl 402 upwardly to engage a shoulder on the pawl with the inner edge of the bar 388 and to rotate the transfer arm to remove its lug from under the stop arm 390. In the normal position the engagement of the shoulder on transfer pawl 402 with bar 388 holds the pawl and transfer arm 400 in the Figure 1 position with the end of the lower arm of pawl 402 to the left of the adjacent rack to the right and in alignment with the transfer teeth of the register wheel 397 to the right. As any register wheel 397 passes from the 9 to the 0 position or from the 0 to the 9 position in addition and subtraction respectively, the transfer tooth thereon will engage the end of the transfer pawl 402 and move it downwardly to free it from bar 388 and enable spring 401 to move transfer arm 400 out from under the stop arm 390 of the next rack bar 385 to the left. That leftward rack bar 385 will not be arrested at the Figure 1 position but will be driven one step downwardly by its spring 394 until its stop arm 390 contacts bar 388. The register wheel 397 which is at that time engaged with the leftward rack bar 385 will receive an extra step of rotation to transfer the ten digit either from or into the register wheel to its right depending upon whether addition or subtraction is being performed.

It is well known that if the machine is to be capable of printing negative totals and subtotals, a "Fugitive One" mechanism should be included in the transfer devices and for this purpose there is provided a "Fugitive One" transfer mechanism connecting the highest order register wheel to the left with the right-hand rack bar 385 as shown in Figure 25. This mechanism has a transfer bail 405 for each set of racks 385. Each bail 405 is pivoted on rod 398 by its two arms. The left-hand arm carries a transfer pawl identical with that for the transfer arms 400 and the right-hand arm has a lug to arrest the stop arm 390 for the right-hand rack 385 so that the total effect of a transfer bail is the same as that of the arms 400 except that the tens transfer digit goes from the leftmost to the rightmost register wheel 397. The two transfer bails 405 are connected together by a spring 406 between their left arms which spring helps the springs 404 in operating the transfer bail 405.

Such transfer arms 400 and transfer pawls 402 as are tripped for transferring during a machine cycle are restored early in the succeeding machine cycle. As shown in Figures 1, 36, and 37, a lever 408 is pivoted on each rod 398 next to each sidewall 45 and 46, with a pin and slot connection between the central ends of the lever arms 408. The lower ends of the two levers 408 on each rod 398 are connected together by a restoring bar 409 positioned outside of the transfer arms 400 to arrest movement of any tripped transfer pawl 402 by its spring 404. Due to the pin and slot connections between their inner arms, the levers 408 all rock together and may be actuated to pick up by the restoring bars 409, all released transfer arms 400 and pawls 402 and restore them to their normal latched position with bar 388. The forward restoring bar 409 is extended to the right to pass through the right sidewall 45 and is engaged in a notch in an arm 410, Figures 36 and 37. Arm 410 is pivoted on a screw 412 in sidewall 45 and is tensioned counterclockwise by a spring 413 to normally hold the restoring bars 409 away from transfer arms 400 as in Figure 36. During the first quarter of any machine cycle, roller 50, shown in dotted lines in this Figure 36 and in Figure 37, on drive shaft 42 engages the front cam shaped edge of arm 410 to rock the arm clockwise to the Figure 37 position and move carry restoring bail 409 to the transfer restoring position. The transfer pawls 402 are moved into latching position with bars 388 to retain the transfer arms in cocked position and, as any transferred rack bars 385 are in a lower position at this time, the lug on transfer arm 400 will strike the tail of the stop arm 390 in its path and rock the stop arm 390 on rack 385. As the actuator 177 rises to 0 during that cycle, its rack bar 385 if it has been lowered in a transfer operation, is raised by stud 386 at the upper end of the slot in rack bar 385 to bring stop arm 390 above the lug of transfer arm 400 whereupon the stop arm 390 is moved by its spring 394 back to its effective position above the lug of the transfer arm 400. Shortly after this time, roller 50 leaves the arm 410 to permit spring 413 to restore the arm 410, restoring bars 409 and the restoring levers 408 to their normal positions.

*Register engaging mechanism*

(Figs. 11 to 14)

Referring to Figure 13, the register wheels 397 are shiftable between a forward engaged position, a central position, and a rear engaged position, i.e., add, neutral, and subtract, by a pair of links 414 outside of sidewalls 45 and 46, through the forward ends of which the register shaft 396 passes. The other ends of links 414 are pivotally secured by screws 416 to a bail 417 extending across the back of the machine and pivoted on screws 418 in the sidewalls 45 and 46. Fixed to the right side of bail 417 is an extension bail 420 rotatable on a stud 421 in the right auxiliary frame 54 and having a pin 422 above stud 421 and another pin 424 below the stud 421. A link 425, see also Figure 11, has two opposed notches in its rear end so spaced that the link can be shifted to engage either pin 422 or 424 only in a forward position of link 425. The forward end of link 425 is provided with a slot through which passes a stud 426 near the end of an arm 428 pivoted on a stud 429 in auxiliary frame 54. Arm 428 is shiftable between two positions as will be later described and is retained in either position by a detent device comprising a pair of notched arms 430 pivoted on a stud 432 in frame 54 and urged together by a spring 433 connected between them into engagement with a roll 434 on the lower end of arm 428.

In the clockwise position of arm 428, hereafter the disengaged position, link 425 is pulled forwardly by stud 426 to the Figure 14 position and through engagement with pin 424 will rock bails 420 and 417 to move register wheels 397 to their neutral position. In this position, a spring 436, Figure 11, rocks link 425 clockwise to normally hold the rear end of link 425 in engagement with pin 424 of bail 420 but it will be seen that the link 425 may be lifted to engage pin 422 rather than pin 424. When link 425 is shifted rearwardly by arm 428 in its counterclockwise, engaged, position of Figure 11, the unengaged pin 422 or 424 will be opposite an unnotched surface of link 425 and shifting of the link 425 to engage the other pin 422 or 424 cannot take place.

The bails 420 and 417 are rocked by link 425 to engage the register wheels 397 with the forward rack bars 385 if link engages pin 424 during its rearward movement to engaged position and will shift wheels 397 into the rear rack bars 385 if link 425 engages pin 422 during this movement. Bails 420 and 417 will be latched in either of these engaged positions to prevent accidental disengagement of register wheels 397 from racks 385. As shown in Figures 11 and 13, the forward side of bail 420 has two notches which may be engaged by an ear 437 of a slide 438 slidable on stud 421 at its rear end and having a slot in its forward end by which it is supported on stud 426 of arm 428. A spring 440 between the front end of slide 438 and stud 426 tends to hold the slide with the front end of its slot against stud 426. When arm 428 is in the disengaged position of Figure 14 it holds slide 438 with ear 437 away from bail 420 which will be in its central position. The initial movement of arm 428 will move slide 438 to engage its ear 437 against bail 420 and will take up the clearance in the slot of link 425. During further movement of link 425, the bail 420 will be rocked to engage the register wheels and as slide 438 is arrested, spring 440 will yield. As bail 420 reaches its fully rocked position, one of its notches will become aligned with ear 437 and spring 440 will then drive slide 438 rearwardly to place ear 437 in the notch to lock the bail 420 as in Figure 11. During the return of arm 428 to the Figure 14 position, stud 426 will first move slide 438 to disengage ear 437 from the notch before stud 426 reaches the forward end of the slot in link 425 to return bail 420 to the disengaged, Figure 14, position.

So long as the register wheels 397 are in engagement with rack bars 385, they can move only as the bars 385 move but wheels 397 must be latched in their set positions while they are in their neutral position and therefore a register wheel aligner is provided. This aligner, Figure 13, consists of a bail 441 having a blade to enter into the teeth of all register wheels and two arms by which it is pivoted on the register engaging links 414.

A spring 442 between a pin 444 on bail 441 and the register wheel shaft 396 tends to drive the aligner 441 into the wheels 397 to hold the wheels in their set positions. The aligner bail 441 is moved out of the teeth of wheels 397 as the wheels 397 are fully meshed with rack bars 385, by cams 445 pivoted one on each of the sidewalls 45 and 46 and having a slot engaging the register wheel shaft 396. A lower cam surface of each cam 445 engages the pin 444 of aligner bail 441 and as cam 445 rocks during the time between the initial and complete entry of the register wheel teeth into the teeth of rack 385, cam 445 will rock the aligner bail 441 to disengage the bail 441 from the register wheels 397 and free them to move with racks 385.

*Additive item entry*

(Figs. 2, 4, 5, 11, 14, 15 and 16)

When the item which has been indexed in the pins 148 of the pin carriage is to be entered into the register wheels 397 in an additive sense, the register wheels are to be engaged with the forward group of rack bars 385 during the return of the bars to their lower positions. After an item has been indexed, a machine cycle is initiated by depression of the add key 446, Figures 2 and 4, slidable in the top and bottom keyboard plates 101 and 102 and urged upwardly by a spring 448, Figure 4. The lower end of key 446 has a lug thereon to limit its upward movement and to engage the keylock plate 232, Figure 5, to lock the key in its set position during a machine cycle as has been set out. A pin 449 on the key 446 limits its depression by engaging with the bottom plate 102. A second pin 450 on key 446 is positioned above a latch arm 452 pivoted on the sidewall 104 and normally held up by pin 449 to position a bent off ear of latch 452 behind a shoulder of a spring driven slide 453. Slide 453 is slidable on studs 250 and is urged to the rear against latch 452 by a spring 454. As key 446 is depressed, latch arm 452 is rocked to release slide 453 which thereupon moves rearwardly to hold key 446 and latch arm 452 in their operated positions and, by a forward upwardly extending ear, engage pin 253 to rock arm 78 and cycle trip shaft 79 to initiate a machine cycle as has been set out. Slide 453 will remain in this position until it is restored by restore cam 57, Figure 26, as has been set out for the repeat key 242.

During the initiated machine cycle, the actuators 177 will be moved to positions corresponding to the indexed pins 148 and the set up item will be printed in the previously described manner. The register wheels 397 are normally left in engagement with the rack bars 385 at the end of a machine cycle and are moved out of engagement before the actuators 177 move in the next cycle. As shown in Figure 11, arm 428 carries a roller 456 which is positioned in alignment with the total cam 59 on shaft 43 to be driven leftward by cam 59 at the initial movement of shaft 43 as shown in Figure 14. Such movement of roller 456 and its arm 428 will shift the register wheels 397 to their neutral position out of engagement with the rack bars 385 before the rack bars 385 are moved by actuators 177.

The add key 446 is also the sub-total key as will be shown at a later point and the selection between addition and sub-totals is controlled by the position of the pin carriage so that if an item is indexed, the following cycle will be an added one. As shown in Figure 5, the pin carriage in its home position engages with its right wall 134, a forward arm of a lever 457 pivoted on a pin 458 in auxiliary frame 54 and urged clockwise by a spring 460, to hold the lever 457 in its counter-clockwise position. The rear end of lever 457 has an upturned ear which fits in a slot in collar 58 to move the collar between the inner position shown in Figure 5 and an outer position. As the pin carriage moves to the left during the indexing of the first digit of an item, lever 457 is released to rotate clockwise and shift the collar to the right. With collar 58 in this position, see Figures 15 and 16, cam 59 is aligned with a roller 461, Figure 16, on an arm 462 pivoted on a screw 464 in frame 54. A second arm 465 is also pivoted on screw 464 and is connected to arm 462 by a spring 466 which holds arm 465 against a stud 468 on arm 462 A lever 469 pivoted on the bottom of arm 465 is urged counterclockwise by a spring 470. A stud 472 in arm 428 passes through a reversed L slot in the forward end of lever 468 and will normally rest in the vertical part of the slot so that arm 428 will move with lever 469 and arms 462 and 465. After the actuators 177 have been positioned at their index pin 148 controlled positions, approximately at mid-cycle, cam 59 will strike roller 461 to shift arms 462 and 465 counterclockwise to pull arm 428 to the engaged position as shown in Figure 15. Register wheels 397 will be engaged by this movement of arm 428 and will stay in the engaged position until the end of the machine cycle.

*Subtractice item entry*

(Figs. 4, 11, 12, 22, 23 and 24)

A subtractive entry of an indexed item into register wheels 397 will be the same as above noted for addition with the exception that the wheels 397 are engaged with the rear rack bars 385 and a subtract key 473 will be operated to initiate the machine cycle. This subtract key 473, Figures 2 and 4 is similar to add key 446 in that it is urged upwardly by a spring 474 and will rock a bell crank 476 as it is depressed to release a slide 477 spring driven rearwardly on studs 250 to initiate a machine cycle and to be restored in the same manner as slide 453 does when the add key 446 is depressed. During the ensuing machine cycle, the register wheels 397 will be disengaged from racks 385 as for addition but before cam 59 acts to reengage wheels 397, link 425, Figure 11, is shifted to engage pin 422. Subtract cam 55, Figures 12 and 22, will shortly after the register wheels 397 are disengaged, release its cam follower arm 378 fixed on a shaft 480 in sidewalls 45 and 46 and having a roller 481 engaging the cam periphery. When cam 55 releases follower 478, the follower arm 478 is free to move and may be rotated counterclockwise by a subtraction bell crank 482 rotatable on shaft 480 and urged counterclockwise by a spring 484 to hold an upper arm against a stud 485 on follower arm 478. Connected to the upper arm of bell crank 482 on a stud 486 is the rear end of a slide 488, see also Figure 24, slidable on stud 142 for the frame 140 and extending forwardly with its front end positioned to the rear of a stud 489 on subtract key 473. When the subtract key 473 is depressed, stud 489 is lowered permitting bell crank 482 to rock and move slide 488 forward as soon as cam 55 releases follower arm 478.

The rear arm of bell crank 482 lies under a pin 490 in link 425 and will lift link 425 as the bell crank 482 rocks, to disengage the link 425 from pin 424 and connect it to pin 422. Then, when link 425 is shifted as has been described, bails 420 and 417 will be rocked to move the register wheels 397 rearwardly into engagement with the rear racks 385 for subtraction. Cam 55 will restore follower arm 478 and through pin 485 return bell crank 482 and slide 488 to their original positions during the latter part of the machine cycle at about the time key 473 is released from lock plate 232. Thus depression of subtract key 473 will change the normal addition cycle by controlling engagement of the register wheels with the rear subtract racks 385 rather than with the front add racks 385.

*Non-addition of an item*

A non-add machine cycle is one in which a set up item is printed but will not be entered into the register wheels. Such a non-add cycle is similar to an add cycle as above described with the exception that the register wheels are not reengaged with the rack bars 385 during their return to the home position. A non-add cycle is initiated after the item has been indexed on pins 148, by depression of a non-add key 492, Figures 2, 4, and 26, which key is slidable in upper and lower keyboard plates 101 and 102 and is urged upwardly by a spring 493. Key 492 is generally similar to add key 446 in that it has a bottom lug, a lower pin 494, Figure 4, and an upper pin 496 which control a latch arm 497. Latch arm 497 normally holds a slide 498 urged rearwardly on studs 250 by a spring 500 and engaging pin 253 to rock cycle trip arm 78 and shaft 79 when released by operation of key 492 to initiate a machine cycle.

Key 492 has additionally an arm 501 carrying a pin 502, Figure 26, secured to its right side and positioned above an arm of bail 504 loosely pivoted on previously described rod 90. The rear end of bail 504 is slotted and slidably engages a stud 505, see also Figure 11, secured in the rear end of lever 457. When lever 457 is released by the first indexing movement of the pin carriage, it moves the rear end of bail 504 to the right to position a leftwardly projecting ear 506 on bail 504 under the front end of register engaging lever 469, as in Figure 28. Lever 469, it will be remembered, is moved to engage the register wheels 397 with rack bars 385 at about the mid-cycle time. Depression of non-add key 492 will through arm 501, rock bail 504 counterclockwise in Figure 26 to lift the front of lever 469 so that pin 472 in arm 428 is in the horizontal part of the slot in lever 469. Under these conditions when lever 469 is moved rearwardly by cam 59, arm 428 will not be driven, see Figure 17, and will remain in the register disengaging position. Thus the indexed amount will be printed but will not be entered into register wheels 397.

*Sub-total taking operation*

(Figs. 5 and 18–21)

A sub-total taking operation is one in which, during a machine cycle, the pin carriage is in its home position and the register wheels 397 are reengaged with the rack bars 385 during their movement from their 0 position until the end of the machine cycle. A sub-total cycle is initiated by depression of the add key 446 with the resultant operations as described above. There is, however, a distinction in that the pin carriage is in its home position rocking lever 457 counterclockwise and it is this lever 457 which determines that the operation shall be a sub-totaling one. With lever 457 in its Figure 5 position, collar 58 is in its inner position and cam 59 is still aligned with roller 456 on arm 428 and is also aligned with another roller 508 on lever 509 pivoted on a stud 510 in auxiliary frame 54, see Figures 20 and 21. Also the other cam 61 on collar 58 is aligned with a roller 512 coaxial with roller 461 but on the right side of arm 462, see Figure 19.

During the machine cycle, cam 59 will rock arm 428 by roller 456 as has been shown, to disengage the register wheels 397 at the start of a machine cycle. When the actuator bars 177 and racks 385 reach their 0 positions, the register wheels are reengaged with rack bars 385 by cam 61 which engages roller 512 to rock arms 462 and 465 as has been set out. At about the mid-cycle point, cam 59 will strike roller 508 to rock lever 509 into the Figure 21 position. A lever 513, pivoted on the lower end of lever 510, is biased counterclockwise by a spring 514 at its rear end to position its forward end which has an inverted L-shaped slot surrounding pin 472 of arm 428, downwardly against pin 472 which will be at the top of the horizontal portion of the slot. When lever 509 is rocked to move lever 513 forwardly, there is no motion transmitted to arm 428 since pin 472 moves idly in the slot and register wheels 397 will stay in engagement with rack bars 385 for the remainder of the cycle.

It will be clear from Figure 1 that if the register wheels 397 are engaged with rack bars 385 during the upward movement of the racks, the rotation of the wheels 397 and upward movement of racks 385 and actuator bars 177 will be arrested when the wide transfer tooth of a register wheel 397 moving in an upward direction strikes against the end of the transfer pawl 402. Such an arrest of actuator bars 177 will disconnect bars 177 from drive levers 186 in the same manner as if bar 177 had struck a set pin 148 so that the type 281 will, when hammers 289 are released, print the amount represented by the original positions of register wheels 397. During the return movement of actuator bars 177, racks 385 rotate wheels 397 back to the positions which they had when reengaged with the rack bars 385 at 0 to complete the sub-total cycle.

During such a sub-total cycle, the 0 stop plate 205 will not be set rearwardly where it would arrest all of the actuators at their 0 position for, as has been stated, the ear on slide 213 which sets stop plate 205 is positioned just to the left of the end plate 206 when the pin carriage is in its normal position and although slide 212 is operated in the sub-total cycle, it will be ineffective.

It is desirable that the rack bars 385 and actuator bars 177 be properly aligned at the 0 position when the register wheels 397 are reengaged with the racks. Although there is a dwell of the actuators 177 at the 0 position under control of cam arm 197, a more precise alignment is preferred and this is obtained from the 0 stop bail 370, Figures 3 and 40. It will be noted that pin 378 of arm 214 is holding the rear end of slide 373 against rearward movement. This arm 214 is, as has been pointed out, rocked counterclockwise for a time at the start of a machine cycle and during such time will move slide 373 forwardly to stretch spring 374 and move the 0 stop bail into the notch of the actuator bars 177 at the start of a machine cycle as described under the heading "Correction Key Mechanism." After the register wheels 397 engage the racks 385, roller 53 releases lever 214 to allow spring 377 to pull the 0 stop bail 370 out of the actuator notches and enable the actuator bars 177 to be raised to the total position.

The repeat key 242 will be latched against depression so long as no item is indexed in the pin carriage. As shown in Figures 5 and 39, the lever 457 has a forward extension which lies under an arm 516 fixed to the repeat key 242 to hold key 242 in its upper position so long as the pin carriage is in its home position.

The subtraction key 473 may also be used to initiate a sub-total cycle. It has been pointed out that the subtract key 473 does everything that is done by the add key 446 and in addition releases the subtract slide 488, Figures 23 and 24. Lever 457, however, will block slide 488 from movement when lever 457 is in its counterclockwise position. An arm 517 fixed to lever 457 will rest in front of an ear on a flange 518 of slide 488 when lever 457 is held by the pin carriage to prevent slide 488 from moving to set the engaging link 425 from moving to the subtract position. Since this movement of slide 488 was the only distinction between the effect of operation of keys 446 and 473, the subtract key 473 is also usable to initiate a subtotal operation under the given conditions.

*Total taking operation*

(Figs. 18–20 and 26)

A total taking operation is the same as the sub-total operation above with the addition that the register wheels 397 are disengaged from rack bars 385 at the middle of the machine cycle and will then be cleared to 0 in all wheels. A total taking operation is initiated by operation of the non-add key 492, Figures 2 and 4, while the pin carriage is in its home position. Cams 59 and 61 will function during the cycle to first disengage and then engage the register wheels as for a sub-total. Operation of key 492 has, however, additionally rocked bail 504 counterclockwise as set out under "Non-Addition of an Item" but as lever 457 is in its counterclockwise position, Figure 5, bail 504 has been moved by lever 457 to position the arm 506 on bail 504 under the front of lever 513, Figures 18 and 20. The rocking of bail 504 by key 492 will now lift the front of lever 513 to position the lever 513 with pin 472 on arm 428 in the vertical part of the slot as shown in Figure 20. When cam 59 operates lever 509 at the mid-cycle time, the forward movement of lever 513 will carry arm 428 to the disengaged position to remove the register wheels 397 from racks 385 leaving the wheels at their 0 positions.

*Negative totals and sub-totals*

(Figs. 5, 11, 12, 22, 24 and 25)

As thus far described, the register wheels 397 will be engaged with the front rack bars 385 during total and sub-total operations. This is correct only so long as the total of the entered items is positive. If, however, the total is a negative one, the wheels 397 should, as is well known, be engaged with the subtract rack bars 385 during the totaling operations and the selection of the set of racks to be engaged is placed under control of the "Fugitive One" mechanism previously described. It is a characteristic of the present type of "Fugitive One" mechanism that the transfer bail 405 on the subtract side will operate when the total in the register wheels becomes negative and when the total changes again to positive, the transfer bail 405 on the add side will operate. A link 520, Figure 25, is supported between two studs 521, one on the lower end of each transfer bail 405 and has two slots through which studs 521 pass, each slot being equal in length to the movement of a stud 521 when its transfer bail 405 operates to transfer the "Fugitive One" and are spaced apart a distance equal to that of the studs 521 when both bails 405 are latched in their normal position. When a transfer bail 405 is released to transfer, its stud 521 will carry slide 520 with the bail 405 and will leave the slide in that position when the bail 405 is restored. Any further operations of that transfer bail 405 will not move slide 520 but the first operation of the other transfer bail 405 will move slide 520 to the other side. Slide 520 then, in effect, remembers whether the register total is positive or negative.

Slide 520 will be retained in its set position by a detent arm 522, Figures 12 and 22, which is connected to slide 520 by a pin 524 on arm 522 and engaged in a notch in slide 520. Arm 522 is pivoted on a stud 525 in sidewall 45 and is held in a set position by an over center spring 526 connected between its upper end and sidewall 45.

Rotatable on the right end of shaft 480 in sidewalls 45 and 46, is a credit total lever 528 urged counterclockwise by a spring 529 (Figure 22) against the pin 485 on cam follower arm 478. A rear arm of lever 528 carries a pin 530 and extends under pin 490 of the link 425, Figures 11 and 22. The forward end of lever 528 will be engaged by an arm 532 secured to lever 457 when the lever 457 is in its clockwise position indicating that an item has been indexed in pins 148 but will be free of arm 532 when lever 457 is swung counterclockwise by the pin carriage in its home position indicating that the following cycle is to be a total cycle unless a new item is indexed. During such a cycle, cam follower arm 478 is released to permit lever 528 to rock. If the total in the register wheels is positive, the lower end of detent arm 522 will be above pin 530 of credit total lever 528 and will prevent an effective movement of lever 528. If, however, the total is negative, slide 520 has rocked detent arm 522 so that it does not arrest lever 528 which will be free to rock further and lift the register shift link 425 into engagement with pin 422. Such a shifting of link 425 occurs during the time that the register wheels 397 are disengaged from the racks 385 and, therefore, when the wheels are reengaged for the totaling, they will engage the racks 385 corresponding to the positive or negative character of the total in the wheels 397.

*Red ribbon shift*

(Figs. 3, 4 and 22)

It is desirable that subtracted items, negative totals, and negative sub-totals be printed in a distinguishing color, usually red, on the record tape. The ink ribbon 328 is, therefore, a bi-color ribbon with a black half on top and the red half on the bottom. For positive amounts, items or totals, the ribbon lift arms 202, Figures 3 and 14, are arrested when the top half of ribbon 328 is at the printing line. A lever 533 on each side is pivoted on studs 340 for the ribbon feed bell cranks 338 and has a projecting upper end normally in the path of a stud 534, Figures 3 and 4, on lift arms 202. Normally lever 533 will arrest ribbon lift arm 202 as the upper half of ribbon 328 is at the printing line. Due to the slot in the lower end of link 201 through which a screw 536 in cam arm 197 passes, such arrest of arms 202 does not affect the movements of arm 197. The lower end of each lever 533 is slotted and pin 485 on cam follower arm 478, Figure 4, is engaged in the slot of the right side lever 533. A stud 537, Figure 3, is engaged in the slot of the left lever 533 and this pin is on an arm similar to arm 478 and secured to shaft 480 but which has been omitted from Figure 3 for reasons of clarity. When cam follower arm 478 is rocked counterclockwise in Figure 4, to rock shaft 480, both levers 533 are rocked to move their upper ends away from studs 534 and lift arms 202 will be freed to move to their upward limit positioning the lower half of ribbon 328 at the printing line. Since both the subtract lever 482 and the negative total lever 528 will move cam follower arm 478 when the levers are free to move, the lower half or red ribbon will be in printing position to cause the amount to be printed in the distinctive color if it is negative.

The above description of the preferred embodiment of my invention is illustrative only as many variations of structure and functional cooperation are possible without departure from the spirit of the invention as set out in the following claims.

What is claimed is:

1. An adding machine of the class described comprising a plurality of actuator members, indexing mechanism having parts settable to differentially limit movement of said actuator members in one direction, each actuator member having a drive member detachably coupled thereto and an aligner movable to hold said actuator member in a fixed position, a part on each drive member to engage the said aligner with its said actuator member as said drive member is detached from its actuator member, each said drive member being detached from its actuator member when said actuator member is arrested by said part of said indexing mechanism, means to move all of said drive members an invariable extent, and means on each said drive member to reset the part of said indexing mechanism which limited movement of its actuator member.

2. An adding machine of the class described comprising a plurality of columns of differentially settable index devices, an actuator for each of said columns, each actuator being differentially arrested in its movement in one direction by a set index device in the aligned one of said columns, a drive member resiliently engaged with each actuator, common means to move all of said drive members an invariable extent, a plurality of aligner members, one for each actuator, each aligner engageable with an adjacent actuator to retain said actuator in set position, means on each drive member to engage an aligner with its actuator when said drive member is released from said actuator due to arrest of an actuator and means on each drive member effective when said drive member is disengaged to reset the set index device which arrested its actuator.

3. An adding machine as set out in claim 2 including a manipulative member and means settable by manipulation of said member to shift all of said index devices to a position wherein said drive members are ineffective to reset the set index devices.

4. An adding machine as set out in claim 2 including a manipulative control member, and means rendered effective by operation of said control member to prevent restoration of said index devices by said drive members.

5. An adding machine of the class described comprising a plurality of digit keys, a shiftable carriage having a plurality of columns of settable index pins, means between said keys and said carriage to enable each said key to set an index pin in one of said columns and to enable a shift of said carriage to position another of said columns into settable position, a plurality of actuators with which said set pins are brought into alignment as said carriage is shifted, a drive member yieldingly coupled to each actuator, common means to drive said drive members and thereby move said actuators, each said drive member disengaging from its coupled actuator as said actuator is arrested by a set one of said index pins, means moved by each said drive member to hold a decoupled actuator in set position, and means on each drive member to reset the index pin which arrested said coupled actuator.

6. An adding machine as claimed in claim 5 including a member settable prior to movement of said actuators by said drive members to arrest movement of such actuators as are not aligned with a set index pin before such actuators are moved into a significant position.

7. An adding machine as claimed in claim 5, including a 0 stop plate on said carriage, said 0 stop plate being settable to arrest all actuators which are not in alignment with said columns of pins and means operative prior to movement of said actuators to set said 0 stop plate to an actuator arresting position, said 0 stop plate being restored to an ineffective position by said drive members of said actuators after said 0 stop plate has arrested said actuators.

8. An adding machine as claimed in claim 7 including a manipulable member, means controlled thereby to shift said carriage to a position wherein said index pins and said 0 stop plate are in the path of movement of said actuators but said drive members are effective to reset only said 0 stop plate.

9. An adding machine of the class described comprising a ten key keyboard, a plurality of pin setting means, each operable by a key of said keyboard, a pin carriage having a plurality of columns of settable pins, each column having one pin for each of said keys, means urging said pin carriage in one direction, a stop member engageable with a pin in one of said columns of pins to hold said pin carriage against movement by said urging means and with said one column of pins in alignment with said pin setting means, said pin setting means including a linkage to set said stop member engaged pin out of engagement with said stop member as any key is operated, a plurality of actuators, each column of index pins being moved into alignment with said actuators when an index pin is set therein, a 0 stop plate on said carriage and shiftable therewith out of alignment with such actuators as are aligned with a column of index pins, a drive member having a part resiliently engaged with each actuator, means to move said drive members to move said actuators into engagement with said set index pins or said 0 stop plate, an aligner for each actuator and operable to hold said actuator in a set position, an aligner operating member on each drive member to operate the aligner for the actuator with which the drive member is engaged, each said aligner operating member being rendered effective during relative movement of said drive member and its resiliently engaged actuator and a part on each said drive member operable during said relative movement to restore from set position the said index pin or 0 stop plate which has arrested its actuator and to also restore any other set pin in the same column of pins.

10. An adding machine as claimed in claim 9 including a movable support for said stop member, a repeat key, means controlled by said repeat key when operated, to move said support and thereby said pin carriage to a different position wherein only said 0 stop plate will be restored by said parts on said drive members and means to set said 0 stop plate into actuator-arresting position prior to each operation of said drive member moving means.

References Cited in the file of this patent

UNITED STATES PATENTS

| | | |
|---|---|---|
| 2,004,495 | Sundstrand | June 11, 1935 |
| 2,308,940 | Sundstrand | Jan. 19, 1943 |
| 2,357,571 | Anderson | Sept. 5, 1944 |
| 2,361,002 | Anderson | Oct. 24, 1944 |
| 2,677,498 | Parker | May 4, 1954 |
| 2,710,139 | Swanson | June 7, 1955 |
| 2,904,248 | Gelling | Sept. 15, 1959 |

FOREIGN PATENTS

| | | |
|---|---|---|
| 747,755 | Germany | Oct. 13, 1944 |